(12) United States Patent
Lawrence et al.

(10) Patent No.: US 11,184,285 B2
(45) Date of Patent: Nov. 23, 2021

(54) SYSTEMS AND METHODS FOR PRIORITIZING REQUESTS FOR HIERARCHICAL LEVEL OF DETAIL CONTENT OVER A COMMUNICATIONS NETWORK

(71) Applicant: Cesium GS, Inc., Exton, PA (US)

(72) Inventors: Joshua Lawrence, Media, PA (US);
Omar Shehata, Philadelphia, PA (US);
Sean Lilley, Philadelphia, PA (US);
Daniel Bagnell, Exton, PA (US);
Patrick Cozzi, Drexel Hill, PA (US)

(73) Assignee: Cesium GS, Inc., Philadelphia, PA (US)

( * ) Notice: Subject to any disclaimer, the term of this patent is extended or adjusted under 35 U.S.C. 154(b) by 0 days.

(21) Appl. No.: 16/851,958

(22) Filed: Apr. 17, 2020

(65) Prior Publication Data
US 2020/0344172 A1    Oct. 29, 2020

Related U.S. Application Data

(60) Provisional application No. 62/837,358, filed on Apr. 23, 2019.

(51) Int. Cl.
*H04L 12/851*  (2013.01)
*G06T 1/20*    (2006.01)

(52) U.S. Cl.
CPC ............ *H04L 47/2433* (2013.01); *G06T 1/20* (2013.01)

(58) Field of Classification Search
CPC ....... G06T 1/20; G06T 11/001; G06T 15/005; G06T 15/04; G06T 17/005; G06T 17/205; G06T 2210/36; H04L 47/2433
See application file for complete search history.

(56) References Cited

U.S. PATENT DOCUMENTS

| 6,057,847 | A  | * | 5/2000 | Jenkins | ................... G06T 15/20 |
| | | | | | 345/422 |
| 6,208,997 | B1 | * | 3/2001 | Sigeti | ...................... G06T 17/05 |

(Continued)

FOREIGN PATENT DOCUMENTS

| EP | 2972095 | A1 | * | 1/2016 | .......... G01C 21/367 |
| EP | 2972095 | A4 | * | 4/2017 | .......... G01C 21/367 |

(Continued)

OTHER PUBLICATIONS

Losasso et al., Geometry clipmaps: terrain rendering using nested regular grids, Aug. 2004, ACM SIGGRAPH 2004 Papers (SIGGRAPH '04), DOI: 10.1145/1186562.1015799 (Year: 2004).*

(Continued)

*Primary Examiner* — Eric Nowlin
(74) *Attorney, Agent, or Firm* — The Marbury Law Group, PLLC

(57) ABSTRACT

Systems, methods, devices, and non-transitory media of various embodiments enable prioritization of requests for hierarchical level of detail (HLOD) content over a communications network. Various embodiment methods may reduce load time of nodes in the HLOD data structure, such as nodes in the HLOD that may be deemed important, compared to the load time achieved in current methods. Various embodiments may provide methods for prioritizing requests for nodes.

26 Claims, 20 Drawing Sheets

(56) References Cited

U.S. PATENT DOCUMENTS

| | | | | |
|---|---|---|---|---|
| 7,551,182 B2* | 6/2009 | Bethune | | G06T 3/40 |
| | | | | 345/501 |
| 8,035,636 B1* | 10/2011 | Yang | | G06T 15/00 |
| | | | | 345/419 |
| 8,451,268 B1* | 5/2013 | Reisman | | G06F 3/04815 |
| | | | | 345/419 |
| 8,922,572 B2* | 12/2014 | Heggelund | | G06T 1/00 |
| | | | | 345/537 |
| 9,317,961 B2* | 4/2016 | Kornmann | | G06T 15/005 |
| 9,853,906 B2* | 12/2017 | Atkins | | H04L 47/24 |
| 9,865,085 B1* | 1/2018 | Eng | | G06T 19/00 |
| 9,959,670 B2* | 5/2018 | Han | | G06T 1/20 |
| 10,082,987 B2* | 9/2018 | Sawata | | G06F 3/1237 |
| 10,867,429 B2* | 12/2020 | Laine | | G06T 15/06 |
| 10,872,469 B2* | 12/2020 | Li | | G06T 17/205 |
| 10,878,628 B2* | 12/2020 | Li | | G06T 17/20 |
| 2002/0065841 A1* | 5/2002 | Matsuda | | G11B 20/10 |
| 2007/0217690 A1* | 9/2007 | Dempski | | G06T 7/90 |
| | | | | 382/228 |
| 2013/0076762 A1* | 3/2013 | Heggelund | | G06T 11/40 |
| | | | | 345/502 |
| 2014/0267282 A1* | 9/2014 | Ren | | G01C 21/00 |
| | | | | 345/428 |
| 2015/0170396 A1* | 6/2015 | Kornmann | | G06T 15/005 |
| | | | | 345/419 |
| 2018/0113655 A1* | 4/2018 | Sawata | | G06F 3/1263 |
| 2019/0251396 A1* | 8/2019 | Geraci | | G06K 9/4628 |
| 2020/0050451 A1* | 2/2020 | Babich | | G06F 9/4843 |
| 2020/0051315 A1* | 2/2020 | Laine | | G06T 15/06 |
| 2020/0097742 A1* | 3/2020 | Kumar | | G06N 3/0454 |
| 2020/0118301 A1* | 4/2020 | Connelly | | G06T 19/20 |
| 2020/0118303 A1* | 4/2020 | Connelly | | G06T 11/00 |
| 2020/0118330 A1* | 4/2020 | Connelly | | G06F 30/13 |
| 2020/0302676 A1* | 9/2020 | Laine | | G06T 15/06 |
| 2020/0302689 A1* | 9/2020 | Li | | G06T 17/20 |
| 2020/0302692 A1* | 9/2020 | Li | | G06T 17/205 |
| 2020/0405401 A1* | 12/2020 | Shelton, IV | | A61B 90/361 |
| 2020/0405403 A1* | 12/2020 | Shelton, IV | | A61B 18/00 |
| 2020/0405416 A1* | 12/2020 | Shelton, IV | | A61B 90/361 |

FOREIGN PATENT DOCUMENTS

| | | | | |
|---|---|---|---|---|
| WO | WO-2014159253 A1 * | 10/2014 | | G01C 21/367 |
| WO | WO-2020081336 A1 * | 4/2020 | | G06T 17/005 |

OTHER PUBLICATIONS

Lindstrom et al., Real-Time, Continuous Level of Detail Rendering of Height Fields, Aug. 1996, Proceedings of the 23rd annual conference on Computer graphics and interactive techniques (SIGGRAPH '96), DOI: 10.1145/237170.237217 (Year: 1996).*

* cited by examiner

SYSTEMS AND METHODS FOR PRIORITIZING REQUESTS FOR HIERARCHICAL LEVEL OF DETAIL CONTENT OVER A COMMUNICATIONS NETWORK

RELATED APPLICATIONS

This application claims priority to U.S. Provisional Application No. 62/837,358 filed on Apr. 23, 2019 entitled "Systems and Methods For Prioritizing Requests For Hierarchical Level Of Detail Content Over A Communications Network," the entire contents of which are hereby incorporated by reference.

BACKGROUND

Computer graphics, and especially three-dimensional (also referred to simply as "3D" herein) visualization, is a rapidly developing computing technology finding new applications in many different industries, including geospatial, defense, and entertainment.

One challenge faced in three-dimensional visualization is the complicated nature of three-dimensional objects. Three-dimensional objects generally are formed from a geometry, often a set of triangles (i.e., a triangle mesh), and textures, often a set of two-dimensional images. A higher quality three-dimensional object often includes large amounts of data that can be spread out over many file locations. As such, high quality three-dimensional objects can be difficult to render in a computing device display. Additionally, high quality three-dimensional objects may not be needed in every visualization. For example, when a camera view point for a three-dimensional model is zoomed out sufficiently, a low-quality three-dimensional object may be suitable for rendering. Accordingly, in three-dimensional visualization it can be beneficial to create multiple versions of a three-dimensional object, such as a high-quality version and a low-quality version.

SUMMARY

The systems, methods, devices, and non-transitory media of various embodiments enable prioritization of requests for hierarchical level of detail (HLOD) content over a communications network. Various embodiment methods may reduce load time of nodes in the HLOD, such as nodes in the HLOD that may be deemed important, compared to the load time achieved in current methods.

Various embodiments may include methods for prioritizing requests for nodes within HLOD content data. In various embodiments, the methods may be performed by a computing device. The methods may include determining one or more node states for each node associated with a traversal of an HLOD structure, generating a request for data of each node associated with the traversal of the HLOD structure, assigning a priority to each request for data of each node associated with the traversal of the HLOD structure based at least in part on that respective node's determined one or more node states, and sending the requests over a network to a server based on the requests' assigned priorities. In some embodiments, sending the requests over the network to the server based on the requests' assigned priorities may include sorting the requests into an issue order based on the assigned priorities, and sending the requests over a network to the server in the issue order. In various embodiments, the one or more node states for each node are based at least in part on a camera state. In various embodiments, the camera state may include one or more of a camera direction, a camera position, and a camera frustum. In various embodiments, the one or more node states are one or more node state variables. In various embodiments, the one or more node state variables include an off-center measurement, a modified screen space error (SSE) deferral, a distance to the camera, a back-facing deferral, a camera destination prediction, an occlusion level, and/or a tree depth. In various embodiments, determining the one or more node state variables for each node may include determining a traversal minimum and traversal maximum for that node state variable, wherein the traversal min may be the lowest value for the node state variable realized for any node in the traversal and the traversal max may be the highest value for the node state variable realized for any node in the traversal. In various embodiments, the assigned priorities are priority numbers. In various embodiments, each priority number is a summation of priority digits associated with a digit value determined for each of the respective node's determined one or more node states.

Various aspects include a device including a processor configured with processor-executable instructions to perform operations of any of the methods summarized above. Various aspects also include a non-transitory processor-readable medium on which is stored processor-executable instructions configured to cause a processor of a device to perform operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
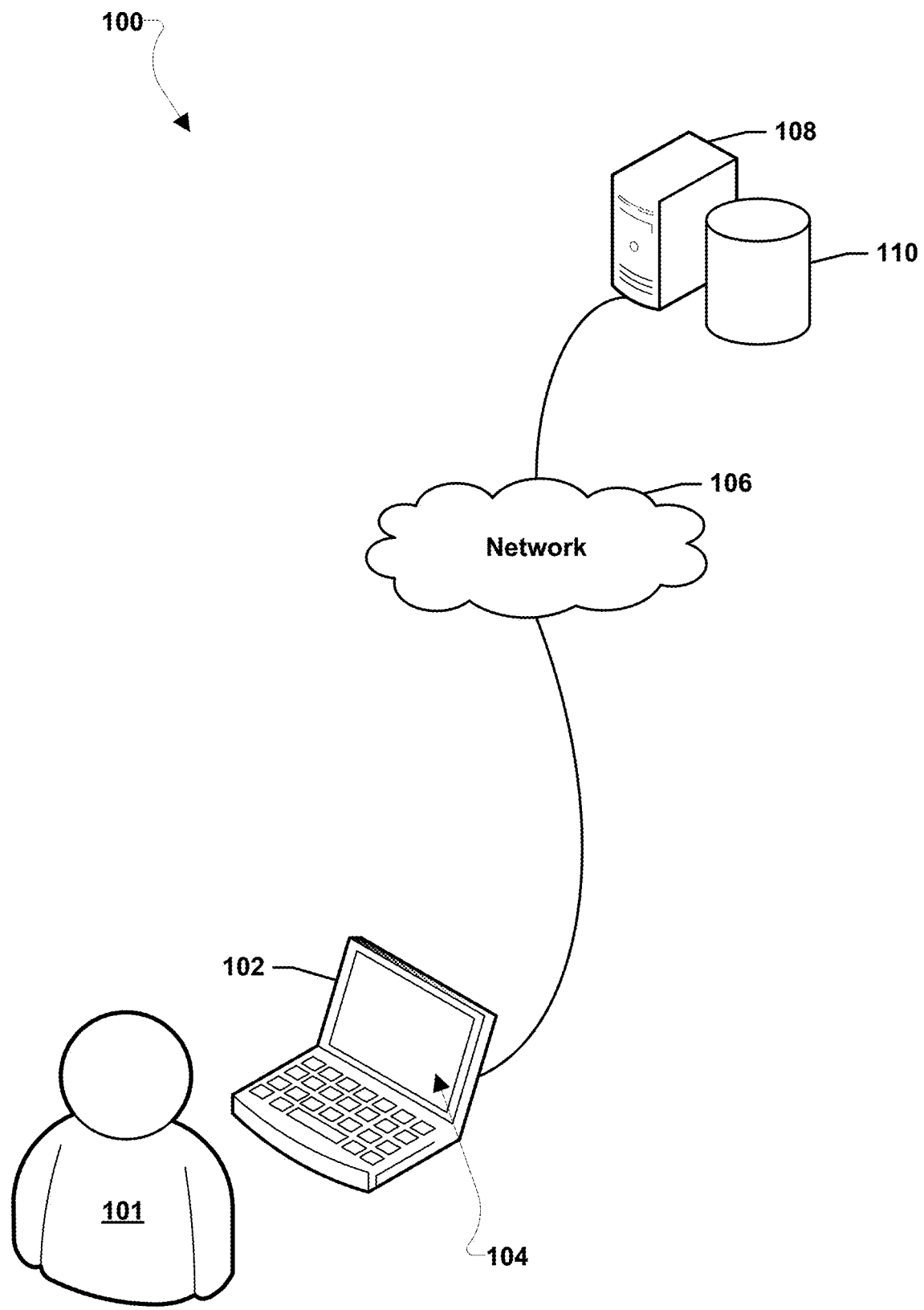
FIG. 1 is a block diagram of an example system suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The term "computing device" as used herein refers to any one or all of cellular telephones, smartphones, personal or mobile multi-media players, personal data assistants (PDA's), laptop computers, personal computers, servers, tablet computers, smartbooks, ultrabooks, palm-top computers, multimedia Internet enabled cellular telephones, and similar electronic devices that include a memory and a programmable processor. While specific examples are listed above, the various embodiments are generally useful in any electronic device that includes a processor and executes application programs.

Textures are often used in computer graphics to increase the detail of information on the surface of triangle meshes. Surface information may include base color, static light color/intensity, influence weight for deformation algorithms, and parameters for shading algorithms, such as bump mapping or subsurface scattering.

Massive 3D models, such as large indexed triangle meshes, can be difficult to render, especially when rendering requires streaming data for the massive 3D model over a network, due to the amount of data associated with the 3D objects in the massive 3D model.

Massive 3D models are often organized into hierarchical level of details (HLOD) data structures to greatly reduce the total amount of data that needs to be rendered at any given time as well as to reduce aliasing. An HLOD structure may be organized in a data tree with nodes defining different levels of detail. The level of detail varies from low detail to high detail as the HLOD is traversed from the roots of the HLOD to the leaves of the HLOD. A node in an HLOD that represents a large 3D model may include data needed to render that portion of the model to which the node corresponds. The HLOD data structure is useful because only a small portion of the data may need to be updated to replace what is no longer at high enough detail as more detail needs to be rendered for a given change in camera view, such as a change in camera view resulting from zooming in on the model.

The data inside HLOD nodes for a 3D model may include vertex data, texture data, or any other information that may be needed to render the portion of the model defined by a HLOD node. Nodes in the HLOD often have a limit on the size of their payload to prevent slow incremental loading in network streaming scenarios. This prevents users from having to wait too long for something to update when the update requires a download of data from a server. Even with these techniques and limits, streaming massive datasets over a network can still be quite slow from a user experience point-of-view.

Prioritizing the request order of HLOD nodes may greatly decrease the wait time for important nodes. When data is not stored locally on the machine running an application, e.g., when data for a 3D model is streamed over a network, it may be extremely important to prioritize the requests for new HLOD nodes so that interesting features and important parts of the 3D model rendered on a screen are updated quickly (e.g., as soon as possible).

FIG. 1 is a block diagram of an example system 100 suitable for use with the various embodiments. The system 100 may include multiple devices, such as a server 108 and computing device 102 connected to a network 106.

Figure 2:
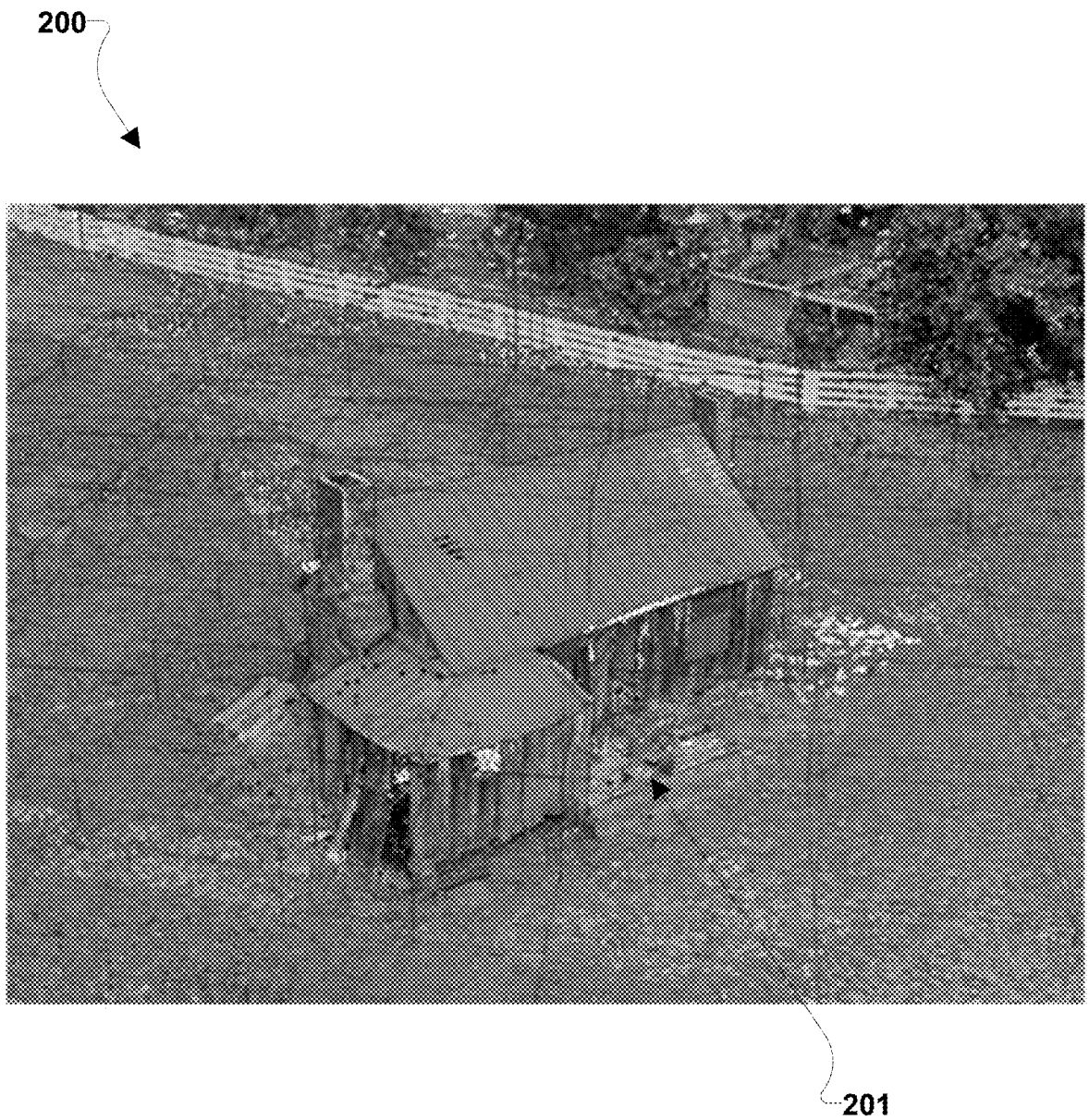
FIG. 2 illustrates a view of a 3D model data set showing bounding volumes of hierarchical level of detail (HLOD) nodes.

The server 108 may include a memory 110 storing data associated with one or more 3D models, such as data sets of 3D models, metadata describing the HLODs of 3D models, etc. The data associated with the one or more 3D models may be massive datasets. The massive 3D models stored in the memory 110 of the server 108 may be organized into HLODs. A node in an HLOD that represents a large 3D model may have or be linked to data needed to render the portion of the model to which the node corresponds. For example, FIG. 2 illustrates a view of a 3D model data set 200 showing bounding volumes of HLOD nodes, such as HLOD node 201. Returning to FIG. 1, the server 108 may be connected to a network 106, such as a Wide Area Network (WAN), a Local Area Network (LAN), and/or the Internet, and may exchange data via the connection to the network 106 with other computing devices connected to the network 106, such as computing device 102. The connections of the server 108 and/or computing device 102 to the network 106, may be wired and/or wireless connections.

The computing device 102 may request data associated with one or more 3D models from the server 108 via the network 106 and may receive data associated with the one or more 3D models from the server 108 via the network. Using the received data, the computing device 102 may render one or more portions of a 3D model on a screen 104 visible to a user 101 of the computing device 102.

Before any requests for data are made, a client-side view of the HLOD structure may be configured at the computing device 102. A request for the metadata information of the HLOD is made by the computing device 102 to the hosting server 108. The server 108 may send the HLOD metadata to the computing device 102. The metadata information may be used by the computing device 102 to configure a client side understanding of the HLOD. This metadata sets up the node relationships in the HLOD tree, as well as the bounding volume of each node within the tree. The bounding volume information demarcates the spatial extents of the rendering assets (i.e., the data of the 3D models stored on the server 108) for which the node is responsible.

Figure 3:
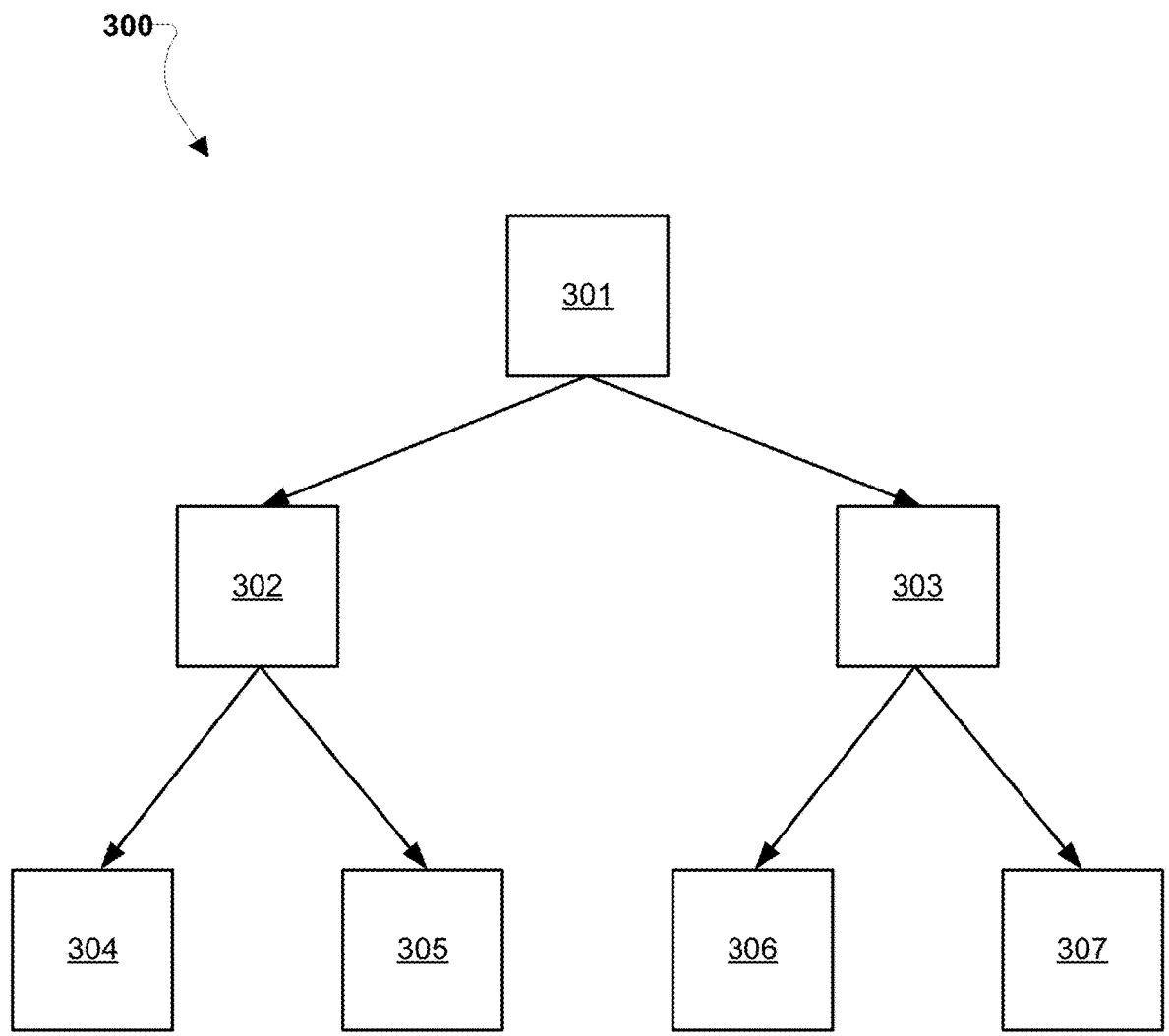
FIG. 3 illustrates a model of an example HLOD structure suitable for use with various embodiments.

FIG. 3 illustrates a simple model of an example HLOD structure 300 suitable for use with various embodiments. The HLOD structure 300 may be generated by the computing device 102 based on HLOD metadata received from the server 108. The HLOD structure 300 may be an HLOD tree structure including node bounds generated from the HLOD metadata. The HLOD may include nodes 301-307, and each node 301-307 may be associated with a bounding volume of a 3D model. The data associated with each node 301-307 may include vertex data, texture data, or any other information that may be needed to render the portion of the model defined by that respective node 301-307. A parent node, such as node 301, may include child nodes, such as nodes 302 and 303, that may also have their own respective child nodes, such as child nodes 304 and 305 for node 302 and child nodes 306 and 307 for node 303.

Figure 4:
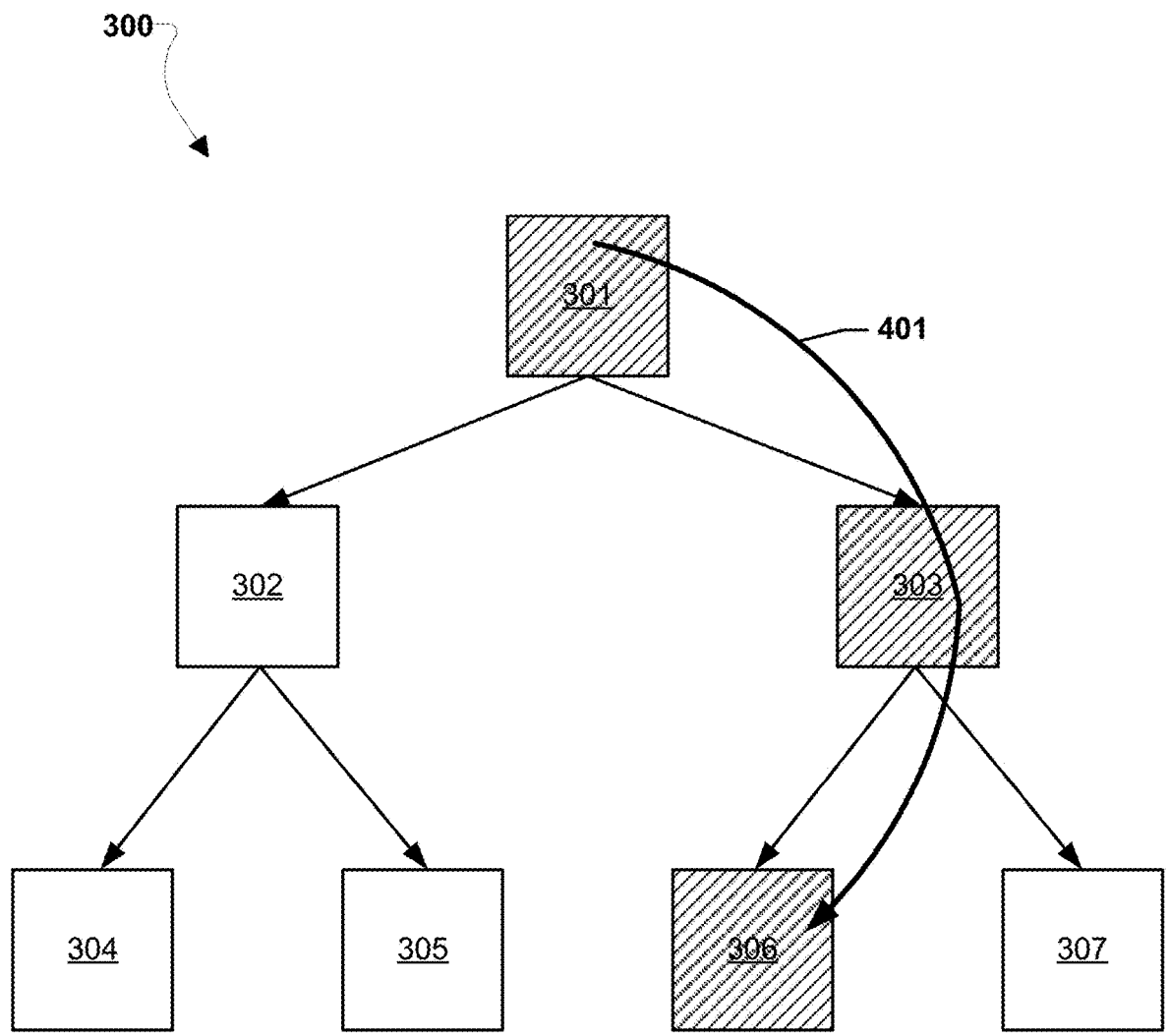
FIG. 4 illustrates an example traversal of the HLOD structure of FIG. 3.

The computing device 102 may traverse the HLOD structure 300 for each frame given a camera state (e.g., camera position, camera orientation, clipping planes, camera frustum, camera view direction, camera movement speed, camera movement direction, etc.) to identify the nodes in the HLOD structure 300 that include assets that need to be rendered to generate the view of the camera during that frame. For example, as illustrated in FIG. 4, a given traversal based on a camera state may identify nodes 301, 303, and 306 as including assets needed to render the view of the camera during a frame. Such a traversal 401 as illustrated in FIG. 4 may result in requests for data of nodes 301, 303, and 306 being generated by the computing device 102. These requests may be sent from the computing device 102 to the server 108, and the server 108 may respond to the requests by sending the data of nodes 301, 303, and 306 to the computing device 102. In response to receiving the data of nodes 301, 303, and 306, the computing device 102 may render the view of the camera on the screen 104 visible to the user 101. Different traversals may result in requests associated with different nodes being generated by the computing device 102. There may be many requests generated for many different HLODs in any given scene representing a camera view to be rendered on a screen 104. The number of requests generated for a given scene may cause the streaming of massive datasets from the server 108 to the computing device 102 over the network 106 to be quite slow from the user experience point-of-view of the user 101 when the number of requests exceeds the bandwidth capacity of the connections between the server 108, network 106, and computing device 102. The number of requests may cause load times for the nodes of the HLOD 300 to be slow and may negatively impact the user experience.

Various embodiments may reduce load time of nodes in an HLOD, such as nodes in the HLOD that may be deemed important, by enabling requests for those nodes to be prioritized and issued in priority order. In various embodiments, node states may be determined during a traversal of an HLOD structure. In various embodiments, node states may be determined based at least in part on the camera's state (e.g., camera position, camera orientation, clipping planes, camera frustum, camera view direction, camera movement speed, camera movement direction, etc.) during a traversal. In various embodiments, a request for a node of an HLOD may be assigned a priority based on the node state determined during a traversal. In various embodiments, requests for nodes may be sorted based on their respective assigned priority and may be issued in order from a highest priority request to a lowest priority request. In various embodiments, a priority may be assigned to a node as a priority number.

Figure 5:
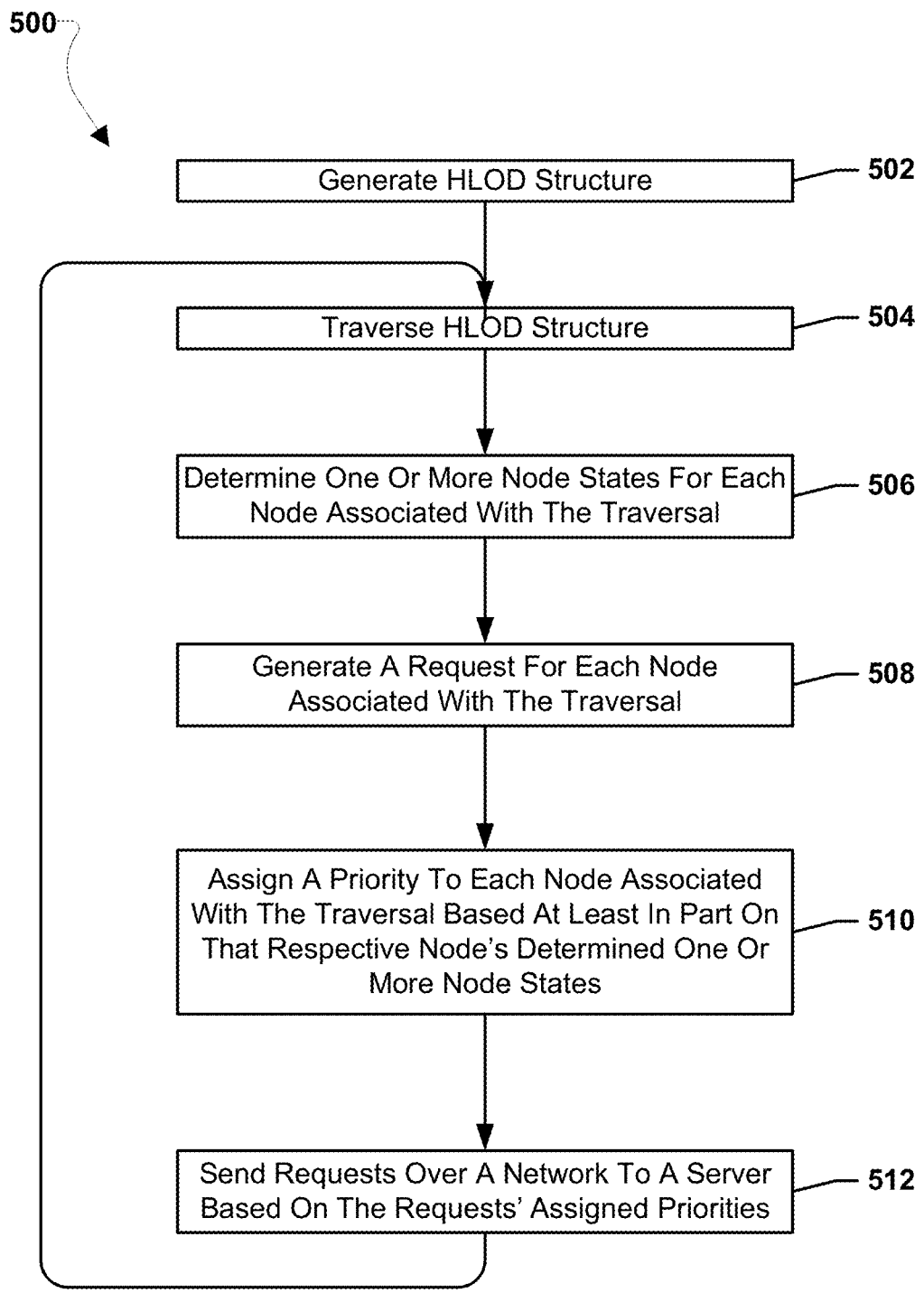
FIG. 5 is a process flow diagram illustrating an embodiment method for prioritizing requests for nodes.

FIG. 5 illustrates an embodiment method 500 for prioritizing requests for nodes. In various embodiments, the operations of method 500 may be performed by a component of a computing device (e.g., computing device 102), such as a central processing unit (CPU), graphics processing unit (GPU), etc.

In block 502, the computing device may generate an HLOD data structure. For example, a request for the metadata information of the HLOD data structure may be made by the computing device (e.g., computing device 102) to the hosting server (e.g., server 108). In response the server may send the HLOD metadata to the computing device. The metadata information may be used by the computing device to configure a client side understanding of the HLOD data structure. This metadata sets up the node relationships in the tree, as well as the bounding volume of each node within the tree. The bounding volume information demarcates the spatial extents of the rendering assets (i.e., the data of the 3D models stored on the host server) defined by each node.

After the tree has been configured, in block 504, the computing device may traverse the HLOD structure. This traversal of the tree may be executed for every frame being rendered and performed based upon the camera's state (e.g., camera position, camera orientation, clipping planes, camera frustum, camera view direction, camera movement speed, camera movement direction, etc.) for each frame. The traversal may identify any nodes that need assets from the host server (e.g., server 108) to enable the nodes to be rendered for the camera view of the given frame. Such nodes including assets that are needed to render a given camera view may represent nodes associated with the traversal.

In block 506, the computing device may determine one or more node states for each node addressed during a given traversal. In various embodiments, node states may be node state variables assigned to each node on a per-traversal basis. Node states may be determined based on a camera state (e.g., camera position, camera orientation, clipping planes, camera frustum, camera view direction, camera movement speed, camera movement direction, etc.) for a traversal. During each traversal, node state variables may be updated. Every time a node state variable is updated, the traversal minimum (traversal min) and traversal maximum (traversal max) for that state variable may be updated as well. The traversal min may be the lowest value for the node state variable realized for any node in the traversal and the traversal max may be the highest value for the node state variable realized for any node in the traversal. In this manner, in various embodiments node states may include node state variables and their respective traversal min and traversal max. These node state variables along with their corresponding traversal min and traversal max may be stored in a memory of the computing device. In some embodiments, a single node state may be determined for a node. In some embodiments, more than one node state may be determined for a node. Example node state variables suitable for use in various embodiments may include an off-center measurement, a modified screen space error (SSE) deferral, a distance to the camera, a back facing deferral, camera destination prediction, and/or an occlusion level. As used herein, SSE may refer to an approximation of a number of pixels difference between rendering a lower-detail version of an object and a higher-detail version of that object.

In various embodiments, node state variables may be chosen such that the node state variables express a relationship between the camera and the HLOD tree, either as a number or a Boolean. In various embodiments, these relationships may be chosen such that nodes may be ordered based on how relatively important the nodes may be to the view of a user. Various heuristics may help place a value on a node's importance to the view of a user, such as how close a node is it to the camera, how off-center the node is from a camera view, etc. For example, node state variables that are numbers may include a node's depth in the HLOD tree, a node bounding volume distance from camera, and a node bounding volume distance to screen center. Node state variables that are Booleans may be set based on whether or not a node satisfies some criteria, such as falling below a certain threshold. Some examples of such criteria include whether a node is contained in the view of a camera flight destination, whether a node is outside some specified view cone, whether a node is mostly back facing content, etc. The only node state variable that may not need to be explicitly updated during each traversal is node tree depth since node tree depth is static node metadata; however, a traversal min and traversal max may still be updated every traversal for the node tree depth. FIGS. 7-17 discussed in more detail below illustrate examples of node state variable determinations that may be used in various embodiments. Node state variables may be used individually or in combination in various embodiments.

In block 508, the computing device may generate a request for data each node associated with the traversal. Each traversal may accumulate requests for any nodes that need data from the server so that the nodes can be rendered for the given camera view associated with the traversal. In various embodiments, the requests may be messages, such as HyperText Transfer Protocol (HTTP) messages, requesting data from the server (e.g., server 108) to enable the portion of the scene corresponding to the node associated with the data request to be rendered by the computing device (e.g., computing device 102) upon receipt of the node data.

In block 510, the computing device may assign a priority to each node associated with the traversal based at least in part on that respective node's determined one or more node states. For example, the node state variables along with their corresponding traversal min and traversal max may be used to generate priority "digits," which may form a priority number for the node. These priority digits may allow for sorting of node requests based on priority. In various embodiments, a node may have more than one node state variables that may be determined for each traversal. As mentioned previously, these node state variables may be Booleans or numbers. The ranges and magnitudes of each node state variable may differ significantly from one another. If a traversal min and traversal max is tracked across all nodes in a traversal, these state variables may be normalized to a 0-1 range, with the value in the 0 to 1 range representing where the node state variable falls between the traversal min and traversal max. For example, as the traversal min may be the lowest value for the node state variable realized for any node in the traversal that value may be mapped to 0 in the 0-1 range. Similarly, as the traversal max may be the highest value for the node state variable realized for any node in the traversal, that value may be mapped to 1. The values between the traversal min and the traversal max may map to decimal values between 0-1 based on their relative position to the traversal min and traversal max. This normalization may enable integrating many different node state variables into a final priority number for a request that expresses the corresponding node's priority relative to all other nodes for which data needs to be requested in a particular traversal.

In block 512, the computing device may send requests for node data over a network to a server based on the requests' assigned priorities. In various embodiments, higher priority node data requests may be sent before lower priority node data requests. In various embodiments, sending the node data requests over the network to the server based on the requests' assigned priorities may include sorting the requests into an issue order based on the assigned priorities and sending the requests over a network to the server in the issue order. In some embodiments, the computing device may sort and merge all requests from all HLODs onto fixed size request queue based on their assigned priority numbers. The computing device may then send requests for the most important traversed nodes from all HLODs before sending less important requests by sending the requests in priority order. As there may be many requests generated for many HLODs in a given scene, in various embodiments these requests may be sorted and merged based on their priority number so that the most important nodes from all HLODs may be requested from the server first.

In various embodiments, the operations of method 500 may be performed continually, such that requests may be prioritized and sent as the HLOD may be repeatedly traversed, such as on a per-frame basis.

Figure 6:
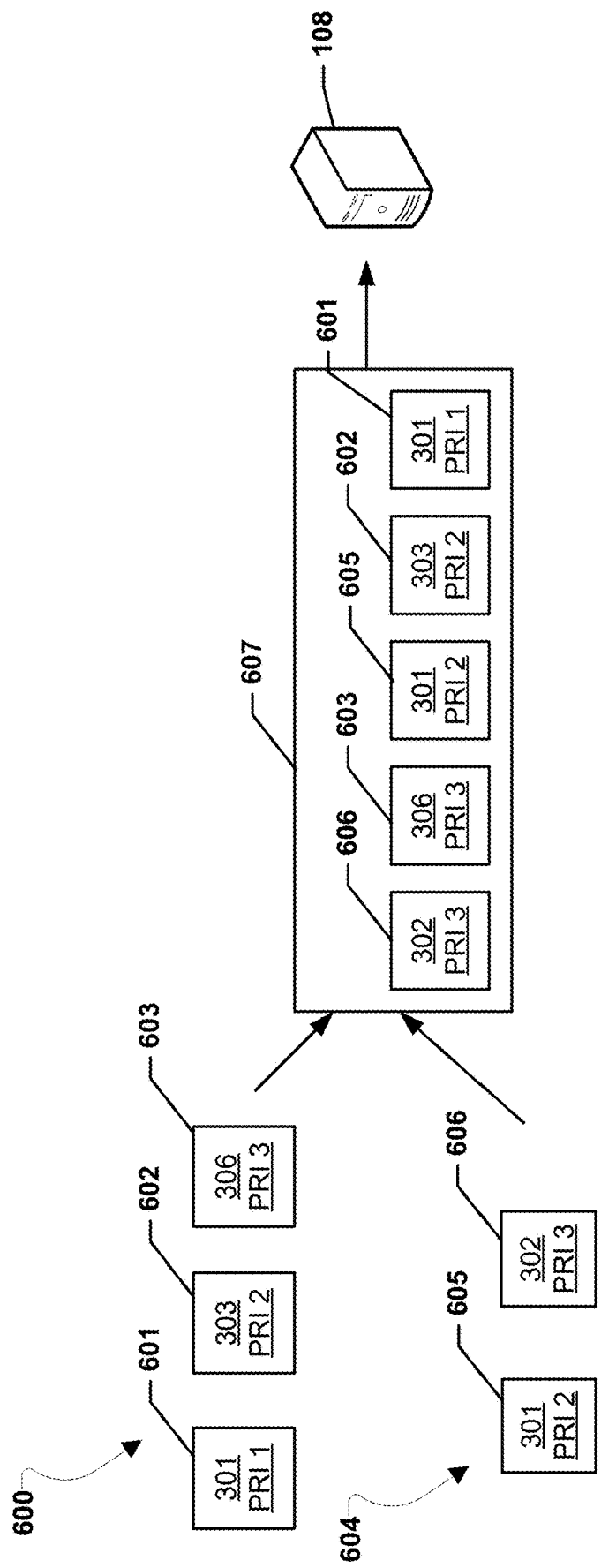
FIG. 6 illustrates an example of prioritizing requests for nodes according to various embodiments.

FIG. 6 illustrates an example of prioritizing requests for nodes according to various embodiments. For example, the operations of method 500 may result in the prioritization illustrated in FIG. 6. As illustrated in FIG. 6, a first traversal 600 of the HLOD structure 300 may result in the node states for nodes 301, 303, and 306 being used to assign priorities to the requests 601, 602, and 603 for those respective nodes 301, 303, and 306. As an example, request 601 may be assigned a highest priority "PRI 1", request 602 may be assigned a next highest priority "PRI 2", and request 603 may be assigned a lowest priority "PRI 3". A second traversal 604 of the HLOD structure 300 may result in the node states of nodes 301 and 302 being used to assign priorities to the requests 606 and 606 for those respective nodes 301 and 302. The traversal 600 and the traversal 604 may be based on different camera states (e.g., camera position, camera orientation, clipping planes, camera frustum, camera view direction, camera movement speed, camera movement direction, etc.), thereby resulting in different nodes being requested (e.g., 301, 303, 306 versus 301, 302), as well as different priorities for various nodes (e.g., a request 601 for node 301 being assigned a highest priority ("PRI 1") for traversal 600 and request 605 for the same node 301 being assigned a next highest priority ("PRI 2") for traversal 604. As illustrated in FIG. 6, the requests 601, 602, 603, 605, and 606 may be sorted and merged into a fixed size request queue 607 based on the assigned priorities. The requests may be sent to the server 108 from the queue 607 in order of priority (e.g., 601, 602, 605, 603, and then 606).

Example node state variables suitable for use, singly or in combination, may include an off-center measurement, a modified screen space error (SSE) deferral, a distance to the camera, a back facing deferral, a camera destination prediction, and/or an occlusion level in various embodiments.

Figure 7:
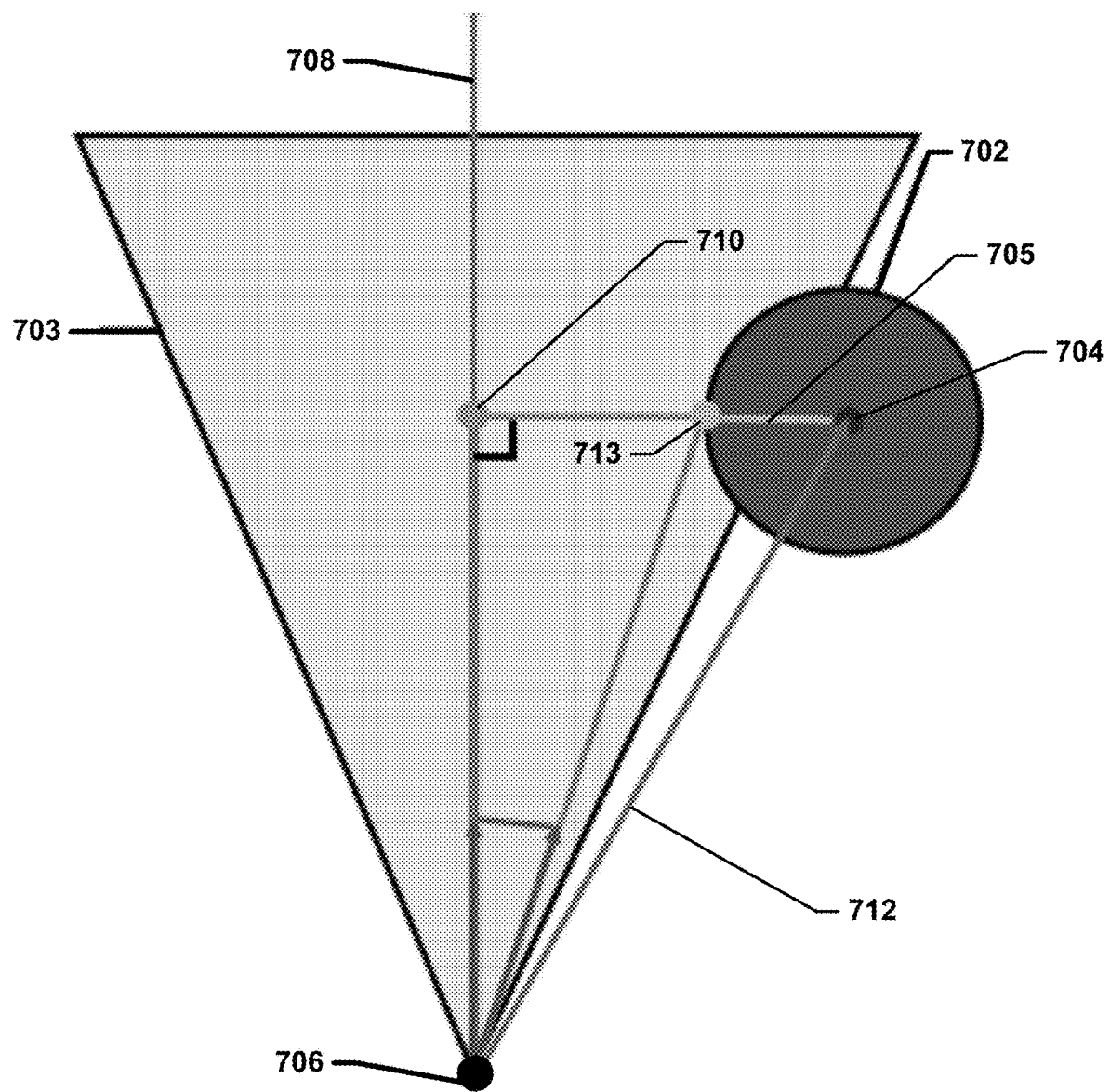
FIG. 7 illustrates an example determination of an off-center measurement as a node state variable according to an embodiment.

FIG. 7 illustrates an example determination of an off-center measurement as a node state variable according to an embodiment. FIG. 7 illustrates a node bounding volume 702 relative to a camera frustum 703. In various embodiments, given a camera and a node, the screen center measurement for the node may be determined. For example, the node's off-center measurement may be the dot product of the normalized camera view direction 708 and the normalized direction to the point 713 on the surface of the node's bounding volume 702 that is closest to the camera view direction line 708. The camera view direction 708 may be provided in the camera state and the normalized direction to the point may be calculated by normalizing the line that goes from the camera position 706 to the point 713 on the surface of the bounding sphere 702 that is closest to the line 708. The vector 712 from the camera position 706 to the node bounding volume center 704 may be found by subtracting the node's center position 704 from the camera's position 706. The closest point 710 on the camera view direction line 708 to the node's bounding volume 702 can be found by projecting the line 712 onto the camera's normalized view direction. In an implementation, the dot product may be set to 1 if this point is contained within the node's bounding volume 702. Using the closest point 710 on the camera view direction line 708 to the node's bounding volume 702 and the node's bounding volume 702 the closest point on the surface of the bounding volume 702 to the camera view direction line 708 may be found. A vector from the node's bounding volume center 704 to the closest point on the camera view line 708 is normalized then scaled by the bounding volumes radius 705. This vector is added to the bounding volumes center 704 to get the closest point to the camera view direction line 708. Finally, a vector from the camera position 706 to this point is normalized and a dot product is taken with the normalized result and the normalized camera view direction. When this value is found the min/max of the traversal for this node state variable may be updated.

Figure 8A:
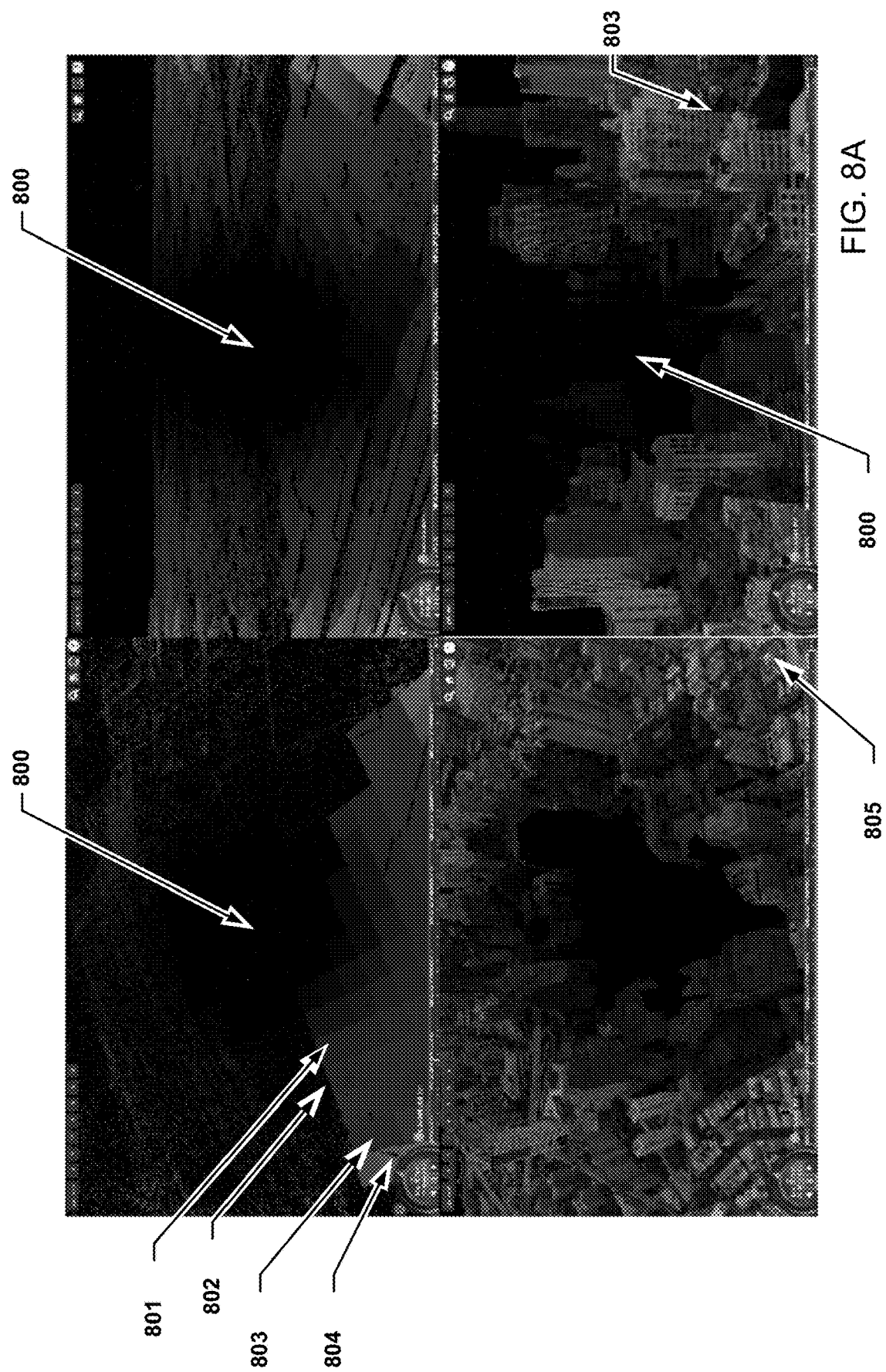
FIG. 8A illustrates heat maps of models of a city showing the node state variable differences for off-center measurements in scenes with different camera views.
Figure 8B:
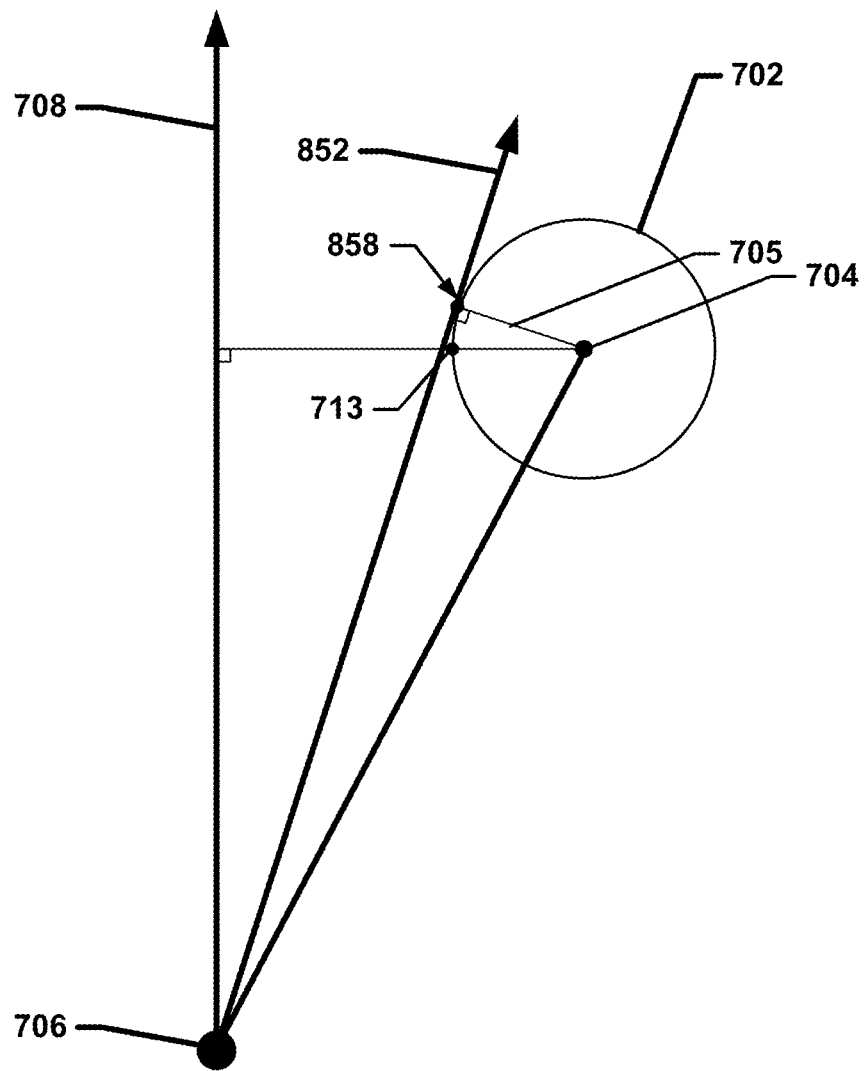
FIG. 8B illustrates another example determination of an off-center measurement as a node state variable according to an embodiment.

FIG. 8A illustrates heat maps of models of a city showing the node state variable differences for off-center measurements in scenes with different camera views. In FIG. 8A, the screen centered measurement is displayed as heat maps to help illustrate how this particular node state variable as a priority metric falls off as a node gets further away from the center of the screen. The upper row of heat maps includes point clouds and the bottom row includes two photogrammetry models of a city. The order of priorities is illustrated by the relative shading of the regions 800-805, and the order of priorities from highest to lowest are regions 800, regions 801, regions 802, regions 803, regions 804, and regions 805 in each heat map as those regions 800, 801, 802, 803, 804, and 805. In other embodiments, the closest radial point on the sphere from the camera view line can be used instead of the point on the sphere that is the closest distance to the camera view line when taking the tile's off-center angle measurement. FIG. 8B illustrates such a swept line determination in which the closest radial point 858 on the sphere that is the node's bounding volume 702 is used as part of the determination of the off-center measurement as a node state variable instead of using the point 713 on the surface of the bounding sphere 702 that is closest to the line 708. As illustrated in FIG. 8B, the closest radial point 858 corresponds to the point at which a swept line 852 of the camera view direction line 708 contacts the surface of the node's bounding volume 702. This closest radial point on the sphere from the camera view line 858 may then be used as part of the determinations discussed above with reference to FIG. 7 instead of the point 713.

In various embodiments, the node state variable differences for off-center measurements may be used to facilitate delaying the loading of periphery tiles on the edges of the screen. For example, nodes where the dot product falls below some threshold may indicate that the node is off-center enough to start considering it for deferral. As used herein, "deferring" or "deferral" may mean penalizing the priority or waiting a certain time limit before requesting the node. A deferral type node state variable may be indicated via a Boolean. For example, nodes corresponding to portions of a scene that are sufficiently off-center may be loaded some time later after a camera stops moving. In various embodiments, a penalty may be incurred by setting the node state value to a maximum value, such as "1" in a variable state range running from 0-1. As an example, true Boolean type node state variables may be assigned values of 1 while false Boolean type node state variables may be assigned values of 0, or vice versa.

Figure 9:
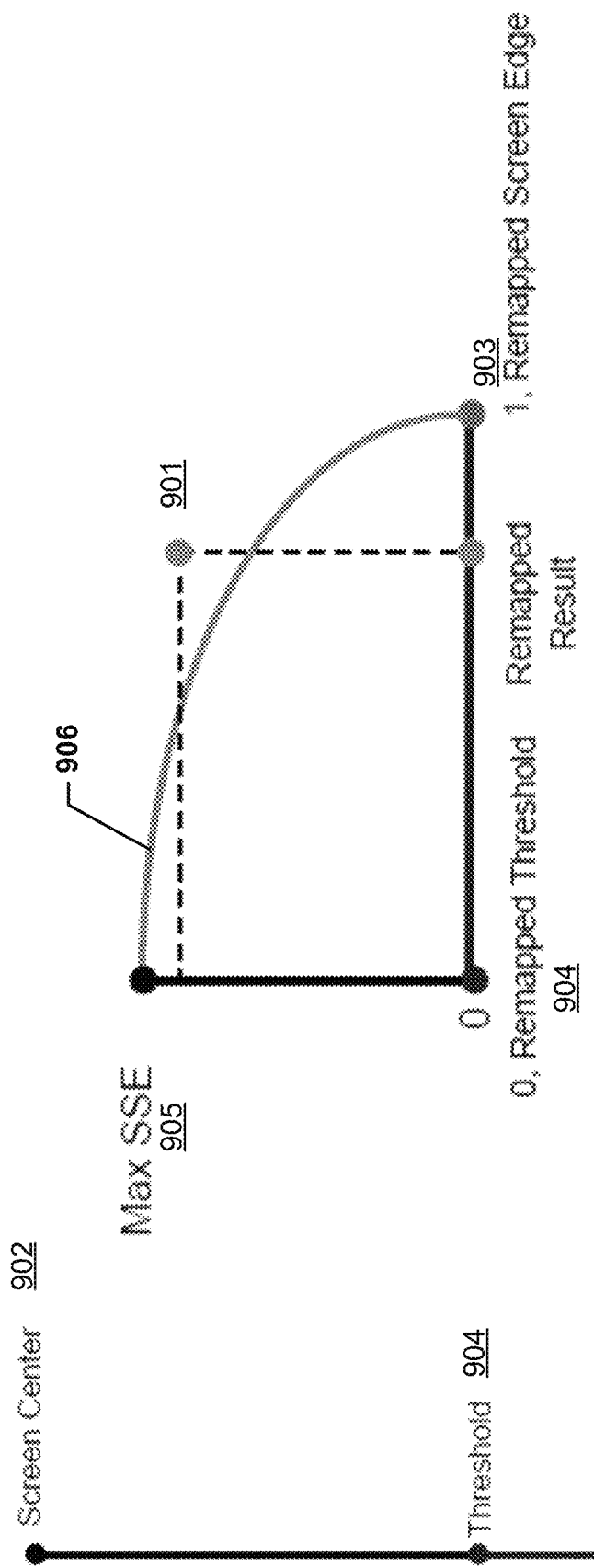
FIG. 9 illustrates an example method for determining a modified SSE deferral as a node state variable.

FIG. 9 illustrates an example method for determining a modified SSE deferral as a node state variable. The method of FIG. 9 may be performed after finding the off-center measurement for a node as described above with reference to FIG. 7. For example, the dot product of the off-center measurement, such as result 901, may be compared to a threshold dot product 904 set between the screen center value 902 and the screen edge value 903. Traversal down the HLOD tree generally stops when a node's screen space error falls below some threshold. For deferring a node, the threshold may be gradually adjusted as the nodes distance from some threshold dot product value increases, thus making it more and more difficult to meet the requirement. This threshold dot product value 904 may be arbitrary and may be set anywhere from the center of the screen 902 to the edge of the screen 903. Threshold 904 simply dictates which nodes may be required to undergo a deferral test. To guarantee that tiles in the center of the screen 902 are never deferred, the threshold 904 may be moved closer to the edge of the screen 903. The result 901 may be compared to the threshold 904, and as it falls below the threshold 904, the result 901 may be remapped into a 0-1 range, for example using linear mapping, exponential mapping, etc. The 0-1 value may be multiplied by the maximum screen space error (SSE) 905 to result in a modified SSE. If the node falls below the curve 906 representing the modified SSE, the node may be deferred. For example, the node's state value may be penalized by assigning the node state variable a value of 1.

Figure 10:
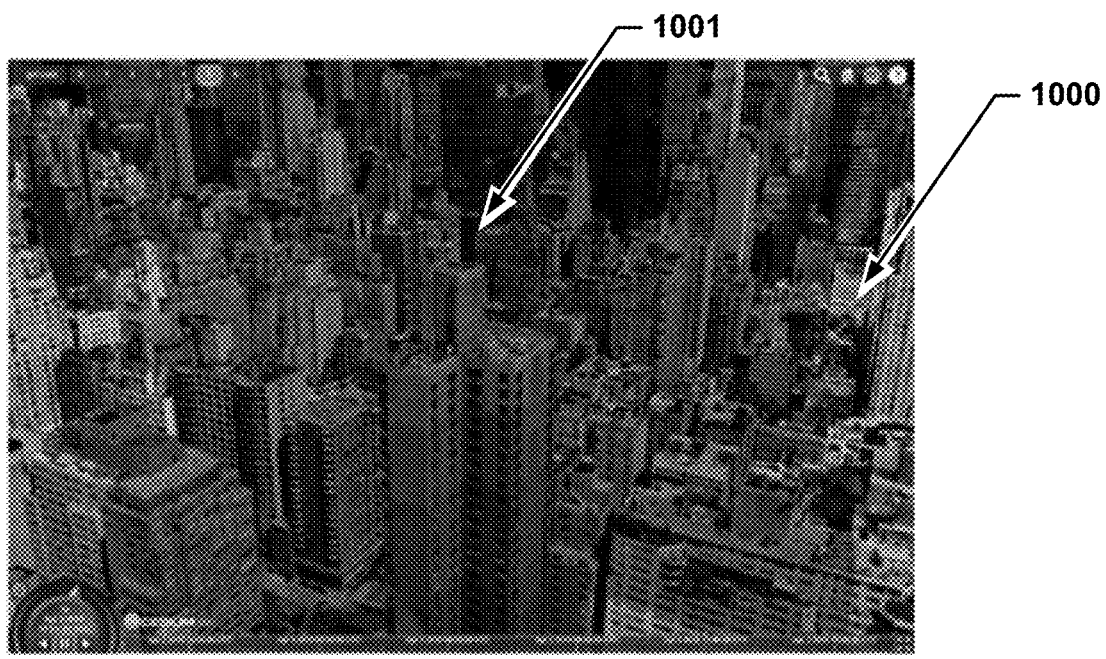
FIG. 10 illustrates a heat map of a model of a city showing the node state variable differences for modified SSE deferral in a scene from a given camera view.

An example in practice is shown in FIG. 10. FIG. 10 illustrates a heat map of a model of a city showing the node state variable differences for modified SSE deferral in a scene from a given camera view. Nodes 1000 were deferred because the corresponding portions of the scene were outside a view cone defined by the threshold dot product and their SSE did not fall below the modified maximum SSE. In contrast, portions of the scene corresponding to nodes 1001 positioned closer to the center of the view cone were not deferred.

Figure 11:
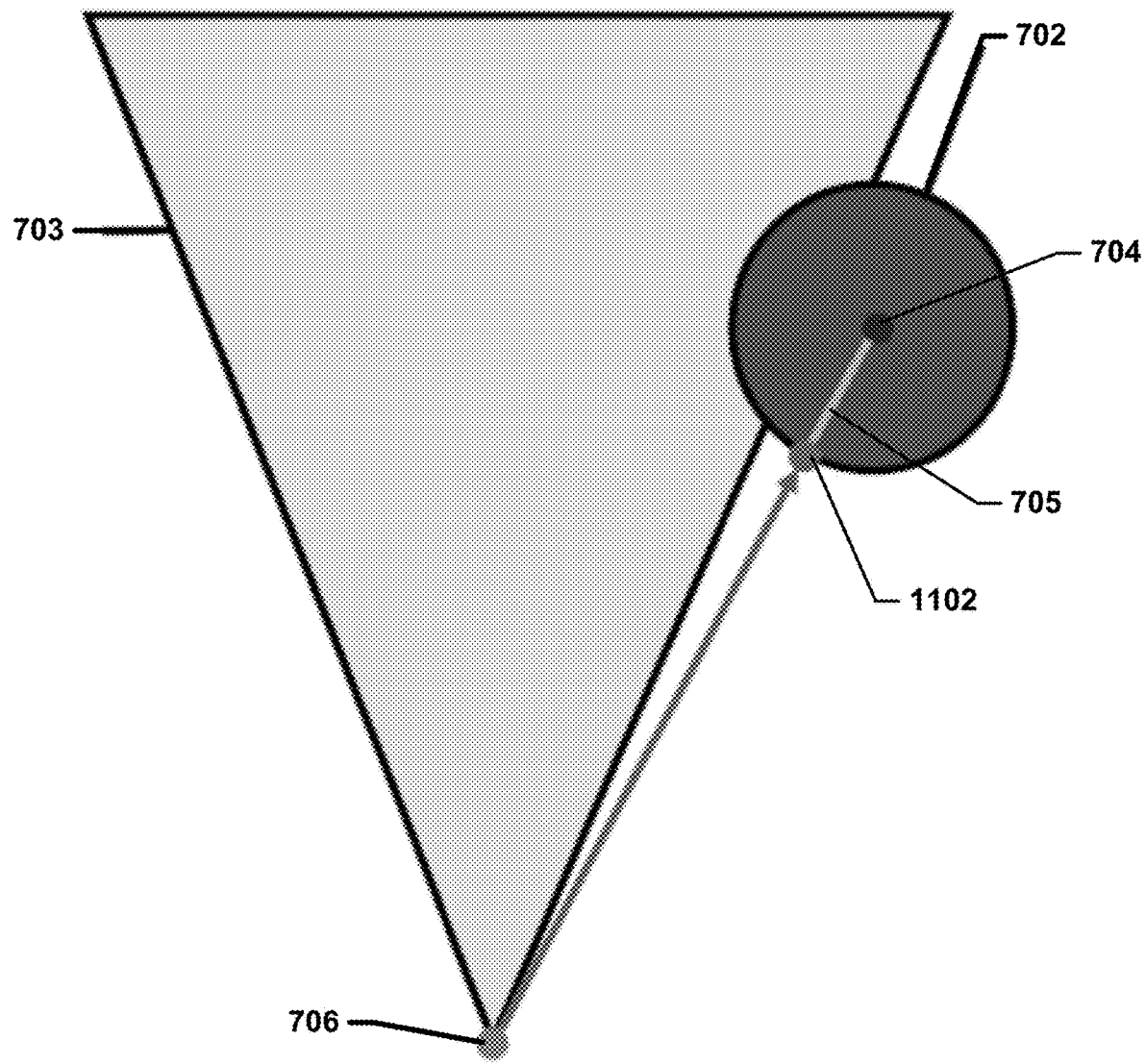
FIG. 11 illustrates an example determination of a distance to a camera as a node state variable according to an embodiment.
Figure 12:
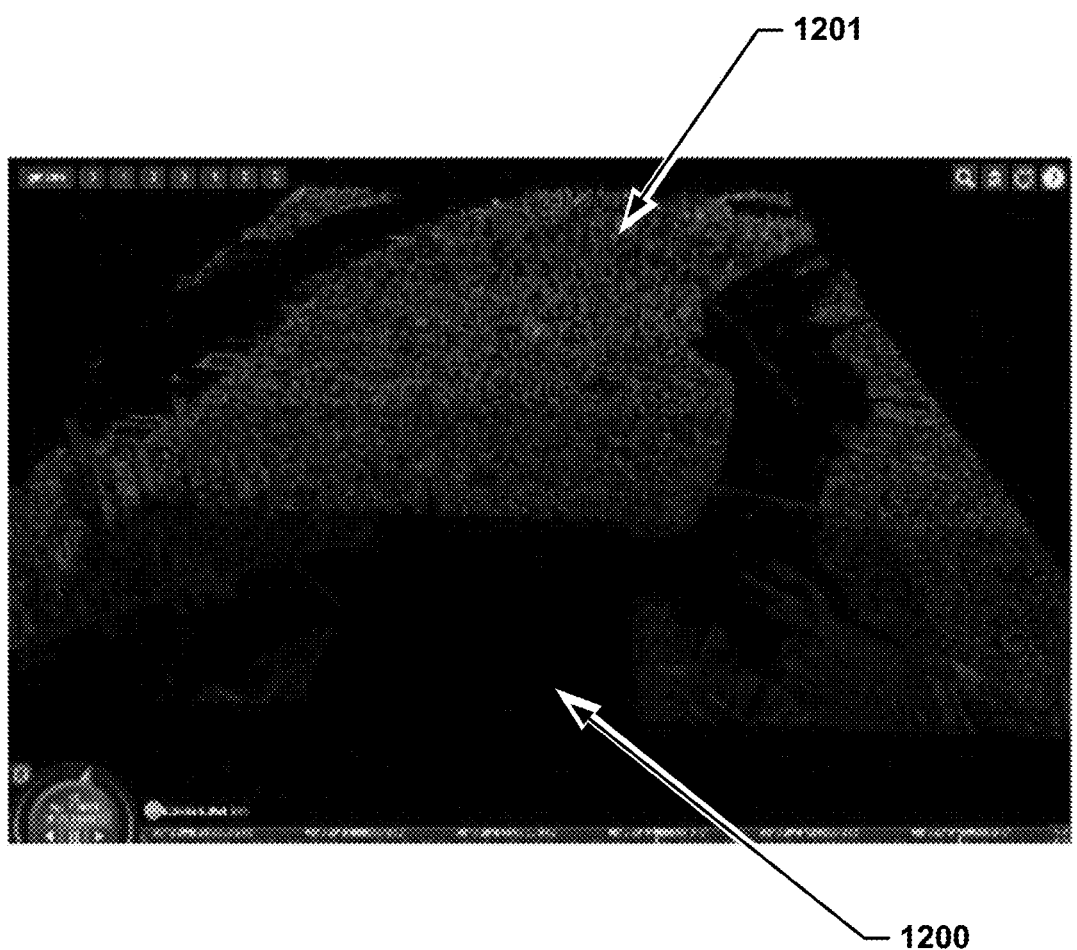
FIG. 12 illustrates a heat map showing the node state variable differences for distance to a camera in a scene from a given camera view.

FIG. 11 illustrates an example determination of a distance to a camera as a node state variable according to an embodiment. The distance to the closest point on the bounding volume 702 may be found by finding the distance from the camera position 706 to the bounding volume center 704 and subtracting the radius 705. Distance to camera may be a useful parameter for depth sorting nodes that have the same value for higher priority state variables. For example, screen centered nodes (i.e., nodes corresponding to a portion of the scene at or close to the center of the scene) are generally more important than nodes that are closest to camera because a user's eyes are typically focused on the center of the screen. However, it may be useful to sort among the nodes that are in the center of the screen based on distance to the camera to handle occlusion scenarios so that nodes in the center of the screen but closer to the camera load before nodes in the center of the screen but further from the camera. FIG. 12 illustrates a heat map showing the node state variable differences for distance to a camera in a scene from a given camera view. In the heat map, darker nodes 1200 are closer to the camera and lighter nodes 1201 are farther from the camera.

Figure 13:
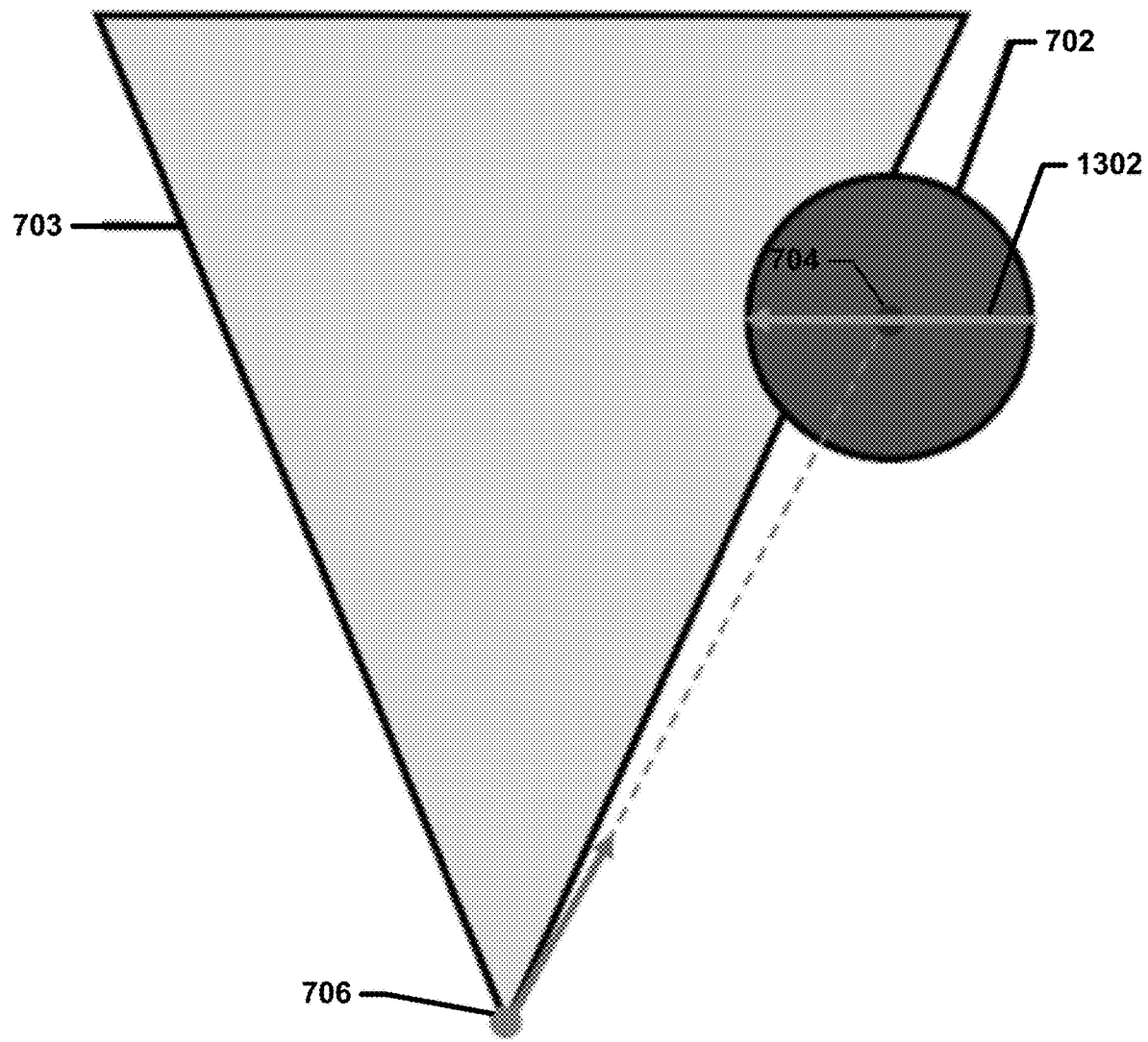
FIG. 13 illustrates an example determination of a back facing deferral as a node state variable according to an embodiment.

FIG. 13 illustrates an example determination of a back facing deferral as a node state variable according to an embodiment. In various embodiments, given a camera view direction and a node dominant content normal direction 1302, the dot product of these two vectors may be determined. If the dot product is greater than or equal to zero, the node may be a back facing node. Such a back facing node may be deferred, such as by assigning a node state value of 1 to the node. As back facing nodes may not be visible to a user, deferring such back facing nodes may not impact the user experience.

Figure 14:
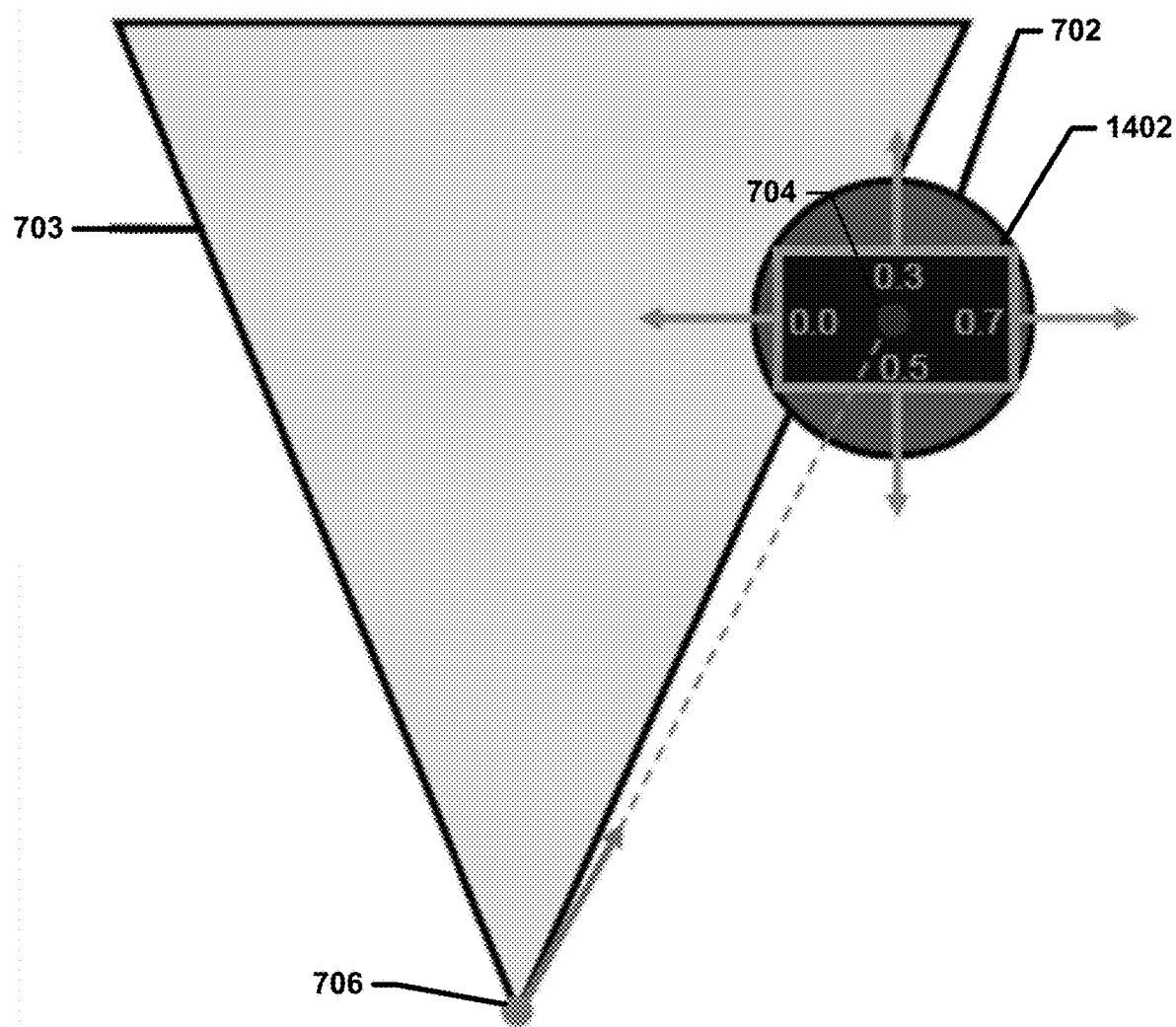
FIG. 14 illustrates an example determination of a back facing deferral as a node state variable according to another embodiment.

FIG. 14 illustrates another example determination of a back facing deferral as a node state variable according to another embodiment. During HLOD generation, a node may be assigned a number for each axis aligned bounding box (AABB) face of its HLOD bounds that expresses how much the content is viewable from that AABB face when viewed head-on. For example, the number may be a 0-1 decimal value that may be converted to a 0-31 value of 5 bits such that all 6 faces of the bounding box may be stored in a 32 bit number and the computing device may convert that assigned 32 bit number back into any more convenient format as needed. The assignment of the number may be done by dividing the space in the HLOD node into a voxel grid and "rasterizing" onto each face, marking voxel faces (on the external HLOD boundary faces) that may "see" front facing content of the HLOD node. The voxel faces may have three states, such as "no content", "front facing content", and "back facing content". The ratio of visible voxel faces to total voxel faces may be used to express content visibility from that face direction. These values may be pre-scaled by the surface area of the HLOD bound face.

During traversal for a given camera view direction and the AABB occlusion factors 1402, the overall occlusion measurement for the node may be determined and compared to a threshold. If the overall occlusion measurement is below the threshold, the request may be flagged as deferred. Such a back facing node may be deferred, such as by assigning a node state value of 1 to the node. The back facing measurement calculated during HLOD traversal may consider AABB occlusion factors 1402 for faces of the AABB that may be facing the camera. The dot product results that pass this test (i.e., may be at or above the threshold) may then be scaled by their corresponding occlusion factors, which may then be scaled by the screen space error of the node and summed together.

Figure 15:
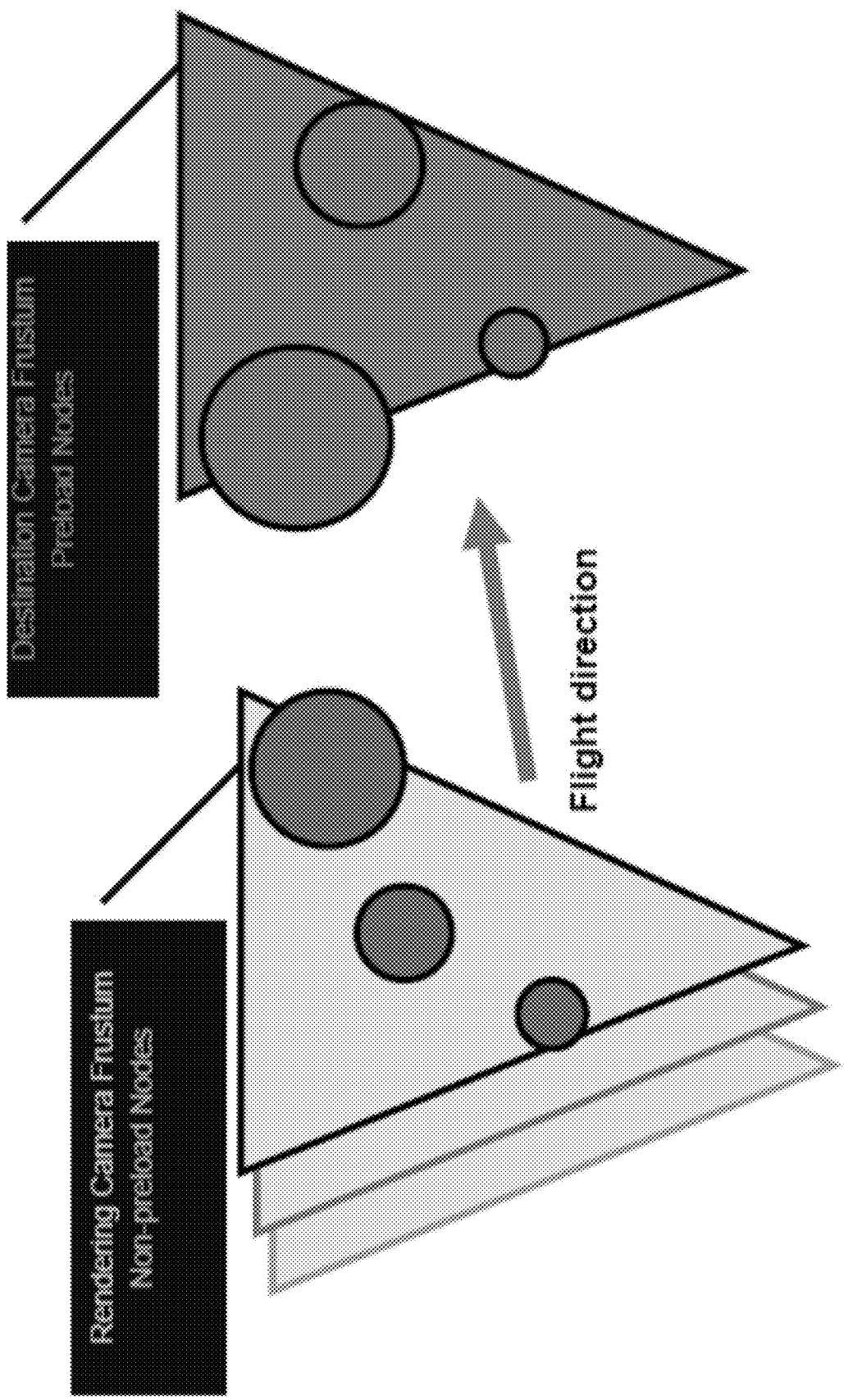
FIG. 15 illustrates an example determination of a camera destination prediction as a node state variable according to an embodiment.

FIG. 15 illustrates an example determination of a camera destination prediction as a node state variable according to an embodiment. FIG. 15 illustrates a comparison between non-preloaded nodes and preloaded nodes over a camera flight direction. In various embodiments, a computing device may determine where the camera will be in the future, for example by automated flight destination determination and/or camera state extrapolation. The computing device may mark any nodes and corresponding requests for the predicted camera's view's traversal as needing to be preloaded. By predicting (e.g., extrapolating movement) or knowing where the camera will be (e.g., the automated flight destination), those nodes that are at the destination may be preloaded such that the destination nodes may be available to render before the camera gets there. For movement prediction, camera position and orientation may be extrapolated. For culling, the 6 most appropriate frustum planes may be selected from among the 12 frustum planes from the current and predicted camera positions. The priority values may be relative to the predicted camera's state so nodes closer to the predicted camera will be preferred. When there is an automated camera flight in progress, the destination may be known. The destination may be very far away so constructing a common frustum from the two camera frustums may be undesirable as that common frustum may span a large portion of the dataset and cause traversal to be very slow. Instead another traversal may be made for the destination camera and nodes at the destination may be flagged for camera flight preloading.

Figure 16:
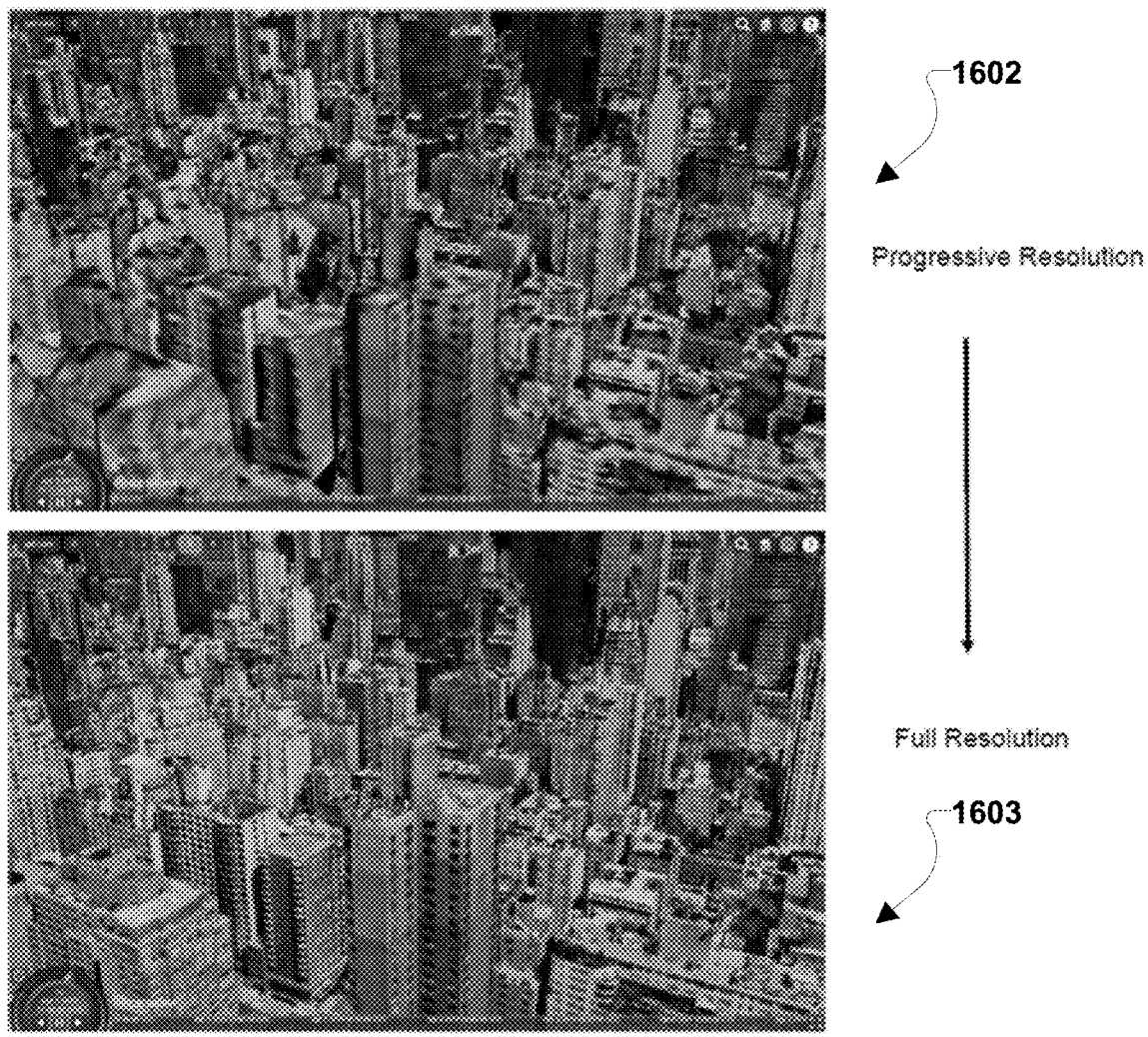
FIG. 16 illustrates a comparison of a progressive resolution view and a full resolution view in a scene from a given camera view.

FIG. 16 illustrates a comparison of a progressive resolution view 1602 and a full resolution view 1603 in a scene from a given camera view. Screen space error of a node may be proportional to screen resolution. As such, for any given camera view of the HLOD, if the screen resolution goes up or down, the number of nodes that need to be requested may increase and decrease to meet the desired maximum error. Based on the screen resolution changes, "screen starvation" (e.g., important areas of the screen taking a long time to update) issues may occur, especially for high resolution screens, such as 16K screens. This may be because certain priority systems may favor certain types of nodes or parts of the screen and it may take a long time to request all nodes of that type before moving onto other nodes. The higher resolution screen may represent (i.e. not alias) highly detailed nodes, even if the camera is far away. With this much higher bar of detail that needs to be met, many more nodes are requested. The area on the screen to which these higher detailed nodes correspond is quite small, compared to a 1080p resolution. In essence, the cost of a node data request in terms of Megabytes/pixel goes up. To manage this, nodes that meet the screen space error requirements of a lower resolution may be prioritized ahead of those that meet the screen space error requirements of the actual screen resolution. This may prevent drastic screen starvation as the entire screen may be updated in multiple passes for however many progressive resolution stages are configured.

Some graphics application programming interfaces (APIs) allow for occlusion queries to be made. This capability may enable generation of a node state variable that may indicate the level to which a requested node's content would be occluded by what's already rendering on the screen. The node's bounding volume may be submitted to the occlusion query. Since the bounding volume is larger and occupies more space than the node's actual content, if the query states that the bounding volume is fully occluded then there is no reason to request the node at all since it wouldn't even be seen (for example, the node may be a portion of the back side of a building). If an occlusion query result is below some threshold for number of query samples passed, then a Boolean can be raised to defer the priority. For example, the value 1 may be assigned to the node state variable to defer the node.

A node may have many node state variables that may be used in a priority system. As mentioned previously, these variables may be Booleans or numbers. The ranges and magnitudes of each node state variable may differ drastically from one another. If a traversal min and traversal max is tracked across all nodes in a traversal, these state variables may be normalized to a 0-1 range. This normalization may make it much easier to integrate many node state variables into a final priority number that expresses the node's priority relative to all other nodes that need to be requested and may be used to assign the priority to the request for that node.

In various embodiments, priority "digits" may serve the purpose of separating node states into buckets such that the node state may be sorted and continuously fetched. The use of such priority digits may provide an alternative to having a state machine waiting to determine priority and issue requests until another phase completes or a state machine filling gaps in a queue when it looks like some type of requests are coming to an end. In various embodiments, priority "digits" may be continuous (e.g., if they are converted from a node variable that is a number) or discrete (e.g., if they are converted from a Boolean). When converting from a number it may be beneficial to have some padding and clamping to prevent collision between node state variable priorities within the given priority (padding) or with lower order priorities (clamping). Alternatively, it may be desirable that the node state variable priorities have some blending amongst each other and no padding and clamping may be used. In cases where node state variable may be blended, it may be beneficial to blend priorities by multiplying each 0-1 mapped node state variable with a weight (where the weights sum to 1). The result may be a number 0-1 and the number may be scaled into a "digit". This may control the blending.

Figure 17:
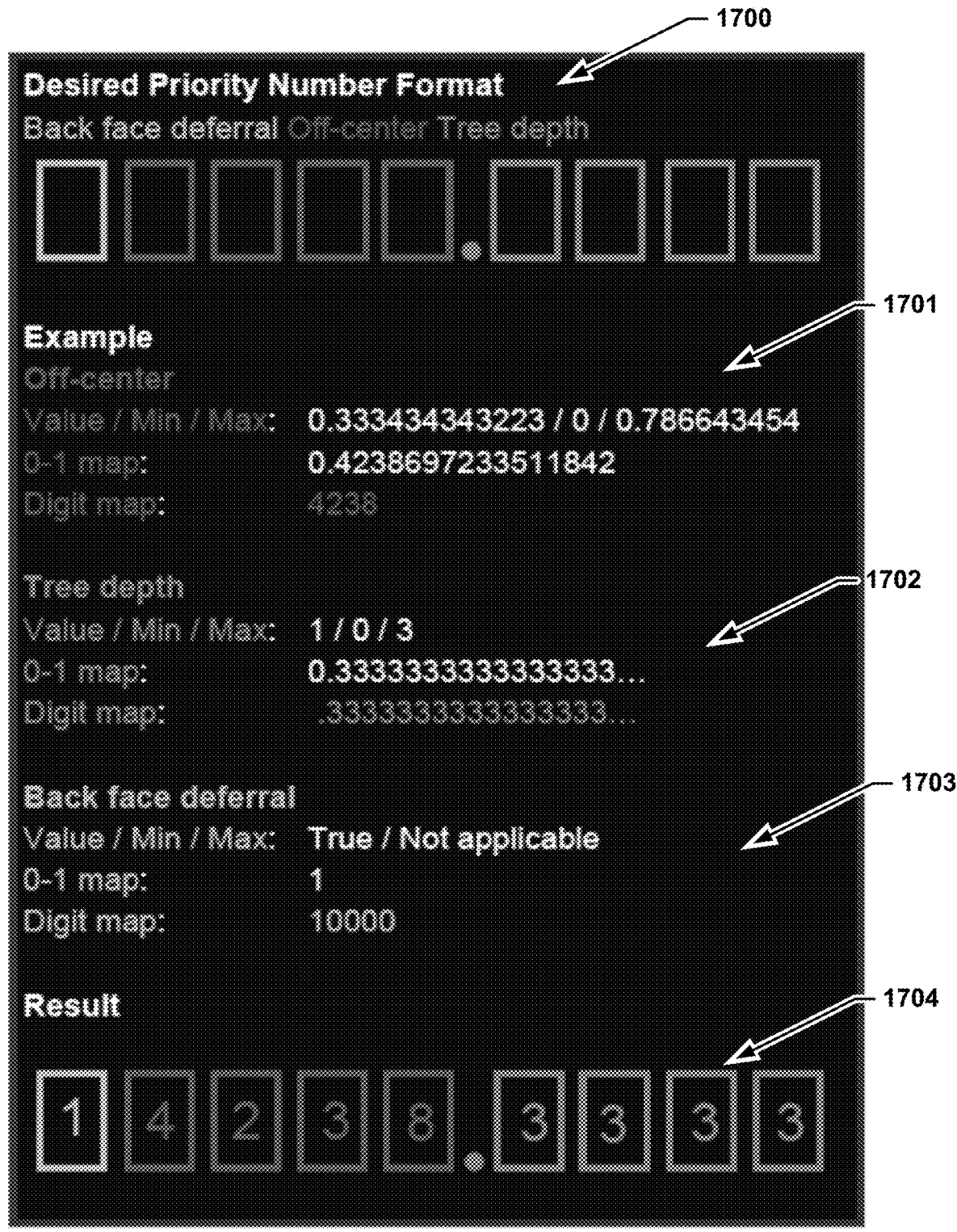
FIG. 17 illustrates an example of determining a priority number according to an embodiment.

FIG. 17 illustrates an example of determining and assigning a priority number (or priority digit) according to an embodiment. The priority number may be determined based on node state variables, such as for example a back facing deferral 1703, an off-center measurement 1701, and a tree depth 1702. The node state variables 1701, 1702, 1703 may be mapped to a desired priority number format 1700. The desired priority number format 1700 may be a template indicating where the digit positions of the node state variables 1701, 1702, and 1703 are indicated in the priority number. In some embodiments, the HLOD metadata from the server may specify a desired priority number format 1700, such as what node states may be used and how those node states may map into final priority number. In the example illustrated in FIG. 17, the off-center measurement 1701 and the tree depth 1702 may be numbers, while the back-facing deferral 1703 may be a Boolean flag. In the example illustrated in FIG. 17, all the nodes containing the back-facing deferral flag 1703 may be desired to be requested after all other nodes, and as such, back facing deferral may correspond to the highest "digit" in the priority number 1700. As such, nodes having this back-facing deferral 1703 flag will have this first digit as part of its priority number, otherwise the digit may be 0. As such, "deferral" flags may operate in a way that the node is penalized for having the flag. Alternatively, other types of flags may work in the opposite manner, such as "preloading" flags, where the node is penalized for not having the flag (e.g., the node state value is 1 when the Boolean result is "false").

FIG. 17 illustrates values for the node state variables 1701, 1702, 1703 determined during traversal. Notice for the off-center measurement 1701 digit the 0-1 mapped number would first be scaled up into how many padding digits it needs to prevent collisions, then converted to an integer to chop off the fractional part to prevent interference with lower order digits, and finally scaled up to its digit slots for which it is responsible. The node state variables 1701, 1702, 1703 may be added together to arrive at a priority digit result 1704 for the node on that traversal. This priority digit result 1704 may be assigned as the priority for the request for that node associated with that traversal. As nodes with different values for the node state variables 1701, 1702, 1703 will have different priority digit results, the priority digit results assigned as priorities to requests for nodes may enable requests to be prioritized over one another based on the node state variables 1701, 1702, 1703.

In the example illustrated in FIG. 17, back face deferral 1703 may control overall priority distinguishing forward facing nodes over back facing nodes. For the other two node state variables, the off-center measurement 1701 and the tree depth 1702, to order similar off-center tiles by their tree depth, the off-center digit may be a higher order digit compared to the tree depth digit. Adding padding and clamping to any higher order "digits" may be beneficial.

Sometimes it may be desirable for nodes to all have the same value for one of the priorities, but be distinguished by the lower order digits. For example, during traversal an ancestor node in the tree may be designated to hold the priority value for all its descendants. Descendant nodes may refer to and update this value. This way nodes in a 'family tree' may be bundled together (i.e., the nodes may all have the same value for one of the priorities) and nodes within the bundle of requests may be distinguished by their other priorities like their depth in the tree.

Various examples are discussed herein using various references to HLOD formats and HLOD content being represented as binary trees, etc. These references are used merely as examples to better illustrate aspects of the various embodiments, and are not intended to limit the disclosure or claims in any way. Other HLOD formats, such as other content formats and other tree structures, may be substituted in the various examples without departing from the scope of the claims.

Figure 18:
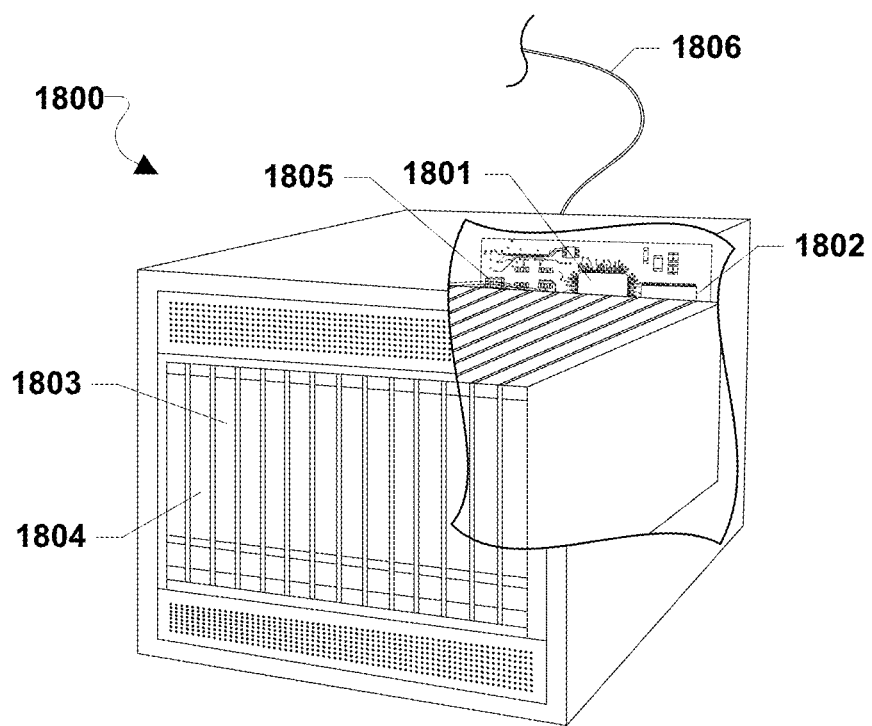
FIG. 18 is a component block diagram of a server that is a computing device suitable for use in the various embodiments.

The various embodiment methods may also be performed partially or completely on a variety of computing devices, such as a server. Such embodiments may be implemented on any of a variety of commercially available server devices, such as the server 1800 illustrated in FIG. 18. Such a server 1800 typically includes a processor 1801 coupled to volatile memory 1802 and a large capacity nonvolatile memory, such as a disk drive 1803. The server 1800 may also include a floppy disc drive, compact disc (CD) or DVD disc drive 1804 coupled to the processor 1801. The server 1800 may also include network access ports 1805 coupled to the processor 1801 for establishing data connections with a network 1806, such as a local area network coupled to other broadcast system computers and servers. The processor 1801 may be any programmable microprocessor, microcomputer or multiple processor chip or chips that may be configured by software instructions (applications) to perform a variety of functions, including the functions of the various embodiments described above. Typically, software applications may be stored in the internal memory 1802, 1803 before they are accessed and loaded into the processor 1801. The processor 1801 may include internal memory sufficient to store the application software instructions.

Figure 19:
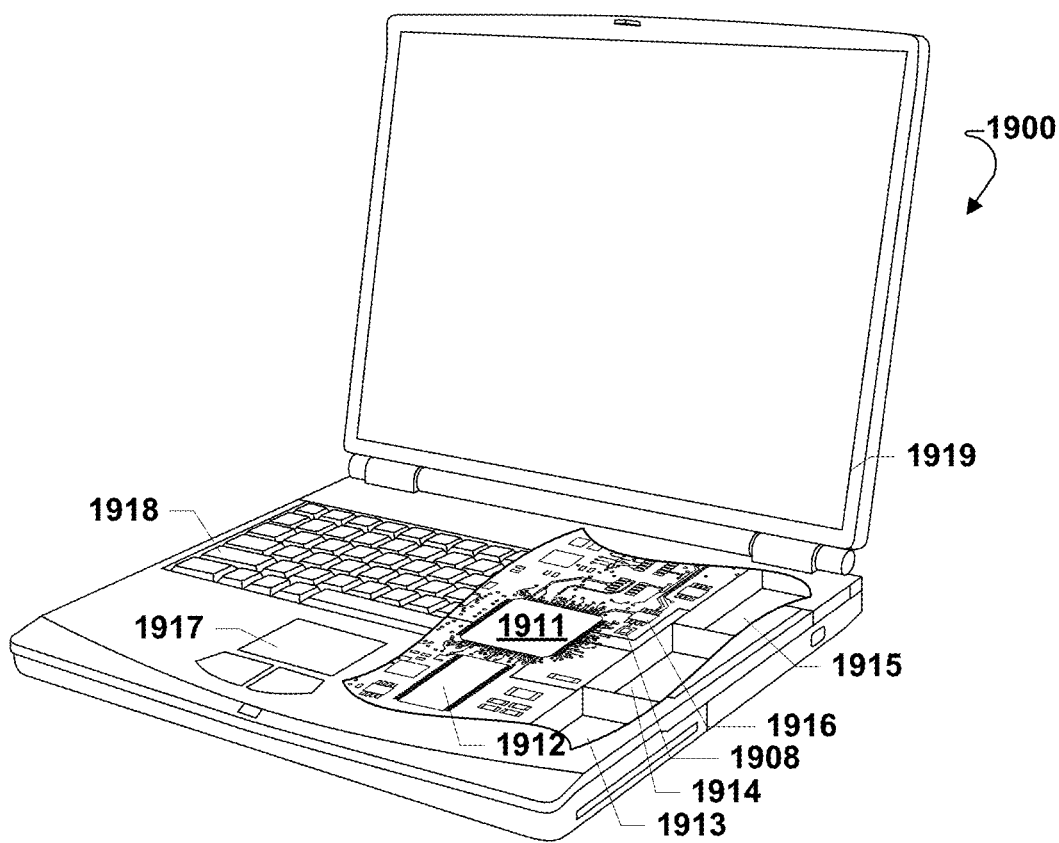
FIG. 19 is a component block diagram of a laptop that is a computing device suitable for use in the various embodiments.

The various embodiments described above may also be implemented within a variety of computing devices, such as a laptop computer 1900 illustrated in FIG. 19. Many laptop computers include a touchpad touch surface 1917 that serves as the computer's pointing device, and thus may receive drag, scroll, and flick gestures similar to those implemented on mobile computing devices equipped with a touch screen display and described above. A laptop computer 1900 will typically include a processor 1911 coupled to volatile memory 1912 and a large capacity nonvolatile memory, such as a disk drive 1913 of Flash memory. Additionally, the computer 1900 may have one or more antennas 1908 for sending and receiving electromagnetic radiation that may be connected to a wireless data link and/or cellular telephone transceiver 1916 coupled to the processor 1911. The computer 1900 may also include a floppy disc drive 1914 and a compact disc (CD) drive 1915 coupled to the processor 1911. In a notebook configuration, the computer housing includes the touchpad 1917, the keyboard 1918, and the display 1919 all coupled to the processor 1911. Other configurations of the mobile computing device may include a computer mouse or trackball coupled to the processor (e.g., via a Universal Serial Bus (USB) input) as are well known, which may also be used in conjunction with the various embodiments.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "unit," "manager" and the like are used interchangeably herein and are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the embodiments disclosed herein may be implemented or performed with a general purpose processor, a GPU, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the claims are not intended to be limited to the embodiments shown herein but are to be accorded the widest scope consistent with the language of the claims and the principles and novel features disclosed herein.

What is claimed is:

1. A method of prioritizing requests for nodes, comprising:
   determining, by a computing device, one or more node state variables for each node associated with a traversal of a hierarchical level of detail (HLOD) data structure, wherein the one or more state variables comprise:
      a modified screen space error (SSE) deferral determined based at least in part on a node measurement value and a maximum SSE; and
      a back facing deferral value determined at least in part on a determined visibility of that node to a user when that node is within a camera frustum;

generating, by the computing device, a request for data of each node associated with the traversal of the HLOD data structure;

assigning, by the computing device, a priority to each request for data of each node associated with the traversal of the HLOD data structure based at least in part on that respective node's determined one or more node state variables; and sending, by the computing device, the requests over a network to a server based on the requests' assigned priorities.

2. The method of claim 1, wherein sending the requests over the network to the server based on the requests' assigned priorities comprises:

sorting, by the computing device, the requests into an issue order based on the assigned priorities; and sending, by the computing device, the requests over the network to the server in the issue order.

3. The method of claim 1, wherein the one or more node state variables for each node are based at least in part on a camera state.

4. The method of claim 3, wherein the camera state comprises one or more of a camera direction and a camera position.

5. The method of claim 1, wherein the one or more node state variables further comprise a measurement of how far off center is a portion of a scene corresponding to the node.

6. The method of claim 1, wherein the one or more node state variables further comprise a distance to a camera.

7. The method of claim 1, wherein the one or more node state variables further comprise a camera destination prediction.

8. The method of claim 1, wherein the one or more node state variables further comprise an occlusion level.

9. The method of claim 1, wherein the one or more node state variables further comprise a tree depth.

10. The method of claim 1, wherein determining the one or more node state variables for each node further comprises determining a traversal minimum and a traversal maximum for that node state variable, wherein the traversal minimum is a lowest value for the node state variables of the traversal and the traversal maximum is a highest value for the node state variables of the traversal.

11. The method of claim 1, wherein the assigned priorities are priority numbers.

12. The method of claim 11, wherein each priority number is a summation of priority digits associated with a digit value determined for each of the respective node's determined one or more node state variables.

13. A computing device, comprising:
a processor configured to:
determine one or more node state variables for each node associated with a traversal of a hierarchical level of detail (HLOD) data structure, wherein the one or more state variables comprise:
a modified screen space error (SSE) deferral determined based at least in part on a node measurement value and a maximum SSE; and
a back facing deferral value determined at least in part on a determined visibility of that node to a user when that node is within a camera frustum;
generate a request for data of each node associated with the traversal of the HLOD data structure;
assign a priority to each request for data of each node associated with the traversal of the HLOD data structure based at least in part on that respective node's determined one or more node state variables; and
send the requests over a network to a server based on the requests' assigned priorities.

14. The computing device of claim 13, wherein the processor is further configured to send the requests over the network to the server based on the requests' assigned priorities by:

sorting the requests into an issue order based on the assigned priorities; and sending the requests over the network to the server in the issue order.

15. The computing device of claim 14, wherein the one or more node state variables for each node are based at least in part on a camera state.

16. The computing device of claim 15, wherein the camera state comprises one or more of a camera direction and a camera position.

17. The computing device of claim 13, wherein the one or more node state variables further comprise:
a) a measurement of how far off center is a portion of a scene corresponding to the node;
b) a distance to a camera;
c) a camera destination prediction;
d) an occlusion level; or
e) a tree depth.

18. The computing device of claim 13, wherein the processor is further configured to determine the one or more node state variables for each node by determining a traversal minimum and a traversal maximum for that node state variable, wherein the traversal minimum is a lowest value for the node state variables of the traversal and the traversal maximum is a highest value for the node state variables of the traversal.

19. The computing device of claim 13, wherein the assigned priorities are priority numbers and each priority number is a summation of priority digits associated with a digit value determined for each of the respective node's determined one or more node state variables.

20. The computing device of claim 19, wherein the processor is a central processing unit (CPU) or a graphics processing unit (GPU).

21. A non-transitory processor readable medium having stored thereon processor-readable instructions configured to cause a processor to perform operations comprising:

determining one or more node state variables for each node associated with a traversal of a hierarchical level of detail (HLOD) data structure, wherein the one or more state variables comprise:
a modified screen space error (SSE) deferral determined based at least in part on a node measurement value and a maximum SSE; and
a back facing deferral value determined at least in part on a determined visibility of that node to a user when that node is within a camera frustum;

generating a request for data of each node associated with the traversal of the HLOD data structure;

assigning a priority to each request for data of each node associated with the traversal of the HLOD data structure based at least in part on that respective node's determined one or more node state variables, wherein the assigned priorities are priority numbers and each priority number is a summation of priority digits associated with a digit value determined for each of the respective node's determined one or more node state variables;

sending the requests over a network to a server based on the requests' assigned priorities.

22. The non-transitory processor readable medium of claim 21, wherein the processor-readable instructions are configured to cause a processor of a computing device to perform operations such that sending the requests over the network to the server based on the requests' assigned priorities by:
sorting the requests into an issue order based on the assigned priorities; and
sending the requests over the network to the server in the issue order.

23. The non-transitory processor readable medium of claim 22, wherein the processor-readable instructions are configured to cause a processor of a computing device to perform operations such that the one or more node state variables for each node are based at least in part on a camera state comprising one or more of a camera direction and a camera position.

24. The non-transitory processor readable medium of claim 22, wherein the processor-readable instructions are configured to cause a processor of a computing device to perform operations such that the one or more node state variables further comprise:
a) a measurement of how far off center is a portion of a scene corresponding to the node;
b) a distance to a camera;
c) a camera destination prediction;
d) an occlusion level; or
e) a tree depth.

25. The non-transitory processor readable medium of claim 24, wherein the processor-readable instructions are configured to cause a processor of a computing device to perform operations further comprising determining the one or more node state variables for each node by determining a traversal minimum and a traversal maximum for that node state variable, wherein the traversal minimum is a lowest value for the node state variables of the traversal and the traversal maximum is a highest value for the node state variables of the traversal.

26. A method of prioritizing requests for nodes, comprising:
determining, by a computing device, one or more node state variables for each node associated with a traversal of a hierarchical level of detail (HLOD) data structure, wherein the one or more state variables comprise a modified screen space error (SSE) deferral determined based at least in part on a node measurement value and a maximum SSE;
generating, by the computing device, a request for data of each node associated with the traversal of the HLOD data structure;
assigning, by the computing device, a priority to each request for data of each node associated with the traversal of the HLOD data structure based at least in part on that respective node's determined one or more node state variables; and
sending, by the computing device, the requests over a network to a server based on the requests' assigned priorities, wherein:
the node measurement value is a dot product of an off center measurement of the node; and
the modified SSE deferral is determined by:
determining the maximum SSE;
comparing the dot product of the off center measurement of the node to a threshold dot product to determine whether the dot product of the off center measurement of the node falls below the threshold dot product;
mapping the dot product of the off center measurement of the node to a range value in response to determining that the dot product of the off center measurement of the node falls below the threshold dot product; and
determining the modified SSE deferral as the range value multiplied by the maximum SSE.

* * * * *